United States Patent
Wada

(10) Patent No.: US 10,044,814 B2
(45) Date of Patent: Aug. 7, 2018

(54) INFORMATION PROCESSING TERMINAL AND CONTROL METHOD FOR PROCESSING BOTH SERVICE SEARCHED ON NETWORK AND SERVICE PROVIDED VIA SITE

(71) Applicant: CANON KABUSHIKI KAISHA, Tokyo (JP)

(72) Inventor: Katsuhiro Wada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 14/793,611

(22) Filed: Jul. 7, 2015

(65) Prior Publication Data
US 2016/0014217 A1    Jan. 14, 2016

(30) Foreign Application Priority Data

Jul. 11, 2014   (JP) ................................ 2014-143237

(51) Int. Cl.
| | |
|---|---|
| *G06F 15/173* | (2006.01) |
| *H04L 29/08* | (2006.01) |
| *H04L 12/26* | (2006.01) |
| *H04L 29/06* | (2006.01) |
| *G06F 17/30* | (2006.01) |

(52) U.S. Cl.
CPC ........ *H04L 67/16* (2013.01); *G06F 17/30893* (2013.01); *H04L 43/12* (2013.01); *H04L 67/02* (2013.01); *H04L 67/10* (2013.01); *H04L 67/125* (2013.01); *H04L 67/30* (2013.01); *H04L 67/42* (2013.01)

(58) Field of Classification Search
CPC ......... H04L 67/16; H04L 43/12; H04L 67/02; H04L 67/10; H04L 67/125; H04L 67/30; H04L 67/42; G06F 17/30893
USPC ................................. 709/224, 223, 202, 203
See application file for complete search history.

(56) References Cited

U.S. PATENT DOCUMENTS

| | | | | |
|---|---|---|---|---|
| 2007/0288632 A1* | 12/2007 | Kanaparti | ............... | H04L 12/12 709/224 |
| 2011/0107225 A1* | 5/2011 | Sukanen | ................. | H04L 67/02 715/736 |
| 2011/0131180 A1* | 6/2011 | Tuli | .................. | G06F 17/30053 707/610 |
| 2011/0276396 A1* | 11/2011 | Rathod | ............. | G06F 17/30867 705/14.49 |

(Continued)

FOREIGN PATENT DOCUMENTS

JP    2013-196356 A    9/2013

*Primary Examiner* — Lan-Dai T Truong
(74) *Attorney, Agent, or Firm* — Canon U.S.A., Inc. IP Division

(57) ABSTRACT

A web browser of an information processing terminal serving as a user agent (UA) is capable of registering function information of a local service that a local server (printer) provides, which is acquired by search, and function information of a service acquired via a site that a server provides. When receiving Invocation in Web Intents, the web browser displays a list of the registered function information to prompt the user to select a service to be used. If function information that has previously been registered has been found by search, the web browser updates display of the list of the registered function information according to a result of the search.

5 Claims, 23 Drawing Sheets

(56) References Cited

U.S. PATENT DOCUMENTS

| | | | |
|---|---|---|---|
| 2014/0025725 A1* | 1/2014 | Park | G06F 3/1423 709/203 |
| 2014/0026067 A1* | 1/2014 | Park | G06F 17/3089 715/748 |
| 2014/0047360 A1* | 2/2014 | Kay | G06F 9/4443 715/760 |
| 2014/0223453 A1* | 8/2014 | Li | G06F 9/547 719/330 |
| 2014/0324949 A1* | 10/2014 | Satomi | H04L 65/1069 709/203 |
| 2015/0012952 A1* | 1/2015 | Sato | H04N 21/4722 725/74 |
| 2015/0026233 A1* | 1/2015 | Kawana | H04L 67/02 709/202 |
| 2015/0195365 A1* | 7/2015 | Choi | H04L 67/16 715/739 |
| 2017/0039269 A1* | 2/2017 | Raff | G06F 17/30979 |

* cited by examiner

FIG.3

```
<intent
  action="http://webintents.org/share"
  type="image/*"
  href="share.html"
  title="Share image using e-mail"
  disposition="window"
/>
```

FIG.4

```
document.getElementById('share-photo').addEventListener(
  "click", function(){
  var intent = new Intent(
      {"action":"http://webintents.org/share",
       "type":"image/jpeg",
      "data":getImageFrom(...)});
  navigator.startActivity(intent, onSuccess);
}, false);
```

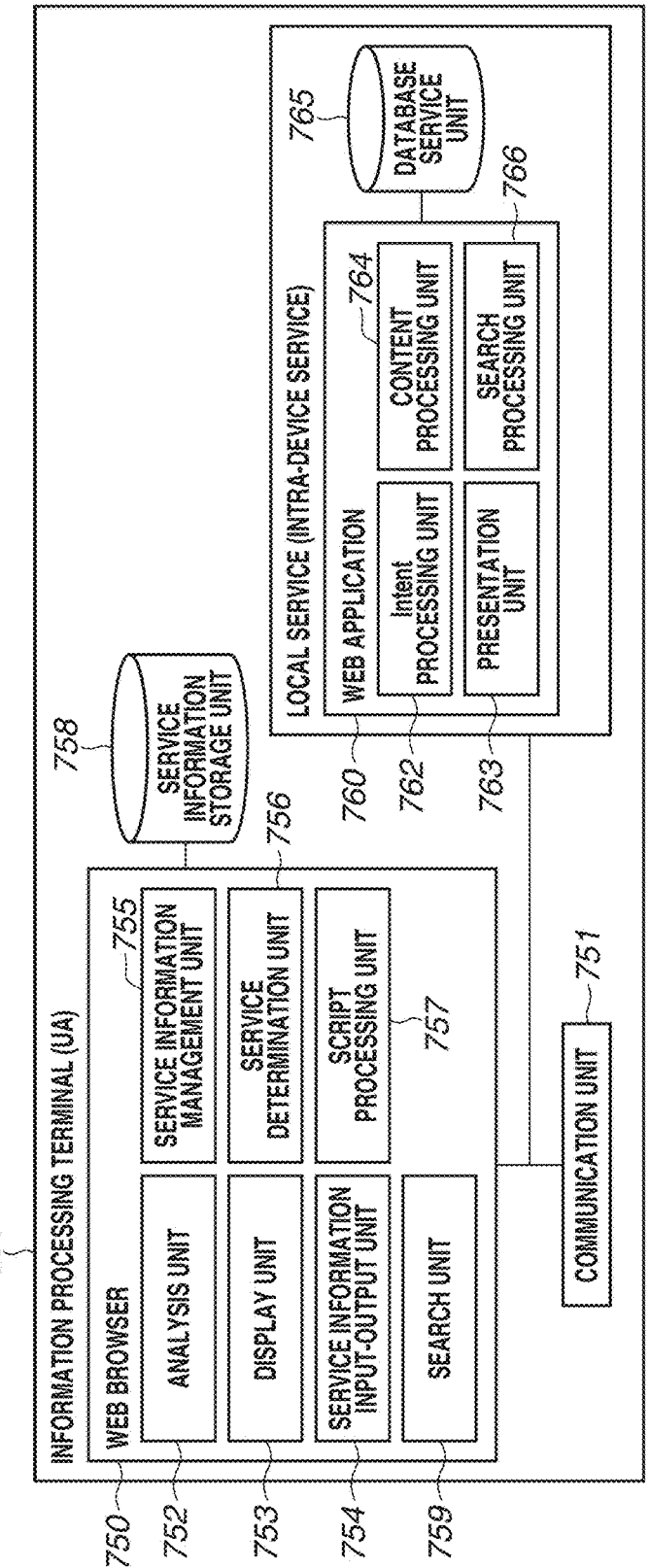

FIG.8A
EXAMPLE OF SERVICE TABLE 800

| Service ID 801 | Action 802 | Type 803 | href 804 | Service Title 805 | Local Service Flag 806 | extend 807 |
|---|---|---|---|---|---|---|
| 1 | print | image/* | https://Printservice.com/print.html | Cloud Print Service | | |
| 2 | print | image/* | https://192.168.1.10/print.html | LBP-100 Print Service | ON (LAN) | State=Y-tonerlow, colorprint |
| 3 | print | image/* | https://localhost/Print2file.html | Print to File Service | ON (Intra-device Service) | State=colorprint |
| 4 | print | image/* | https://192.168.1.12/print.html | LBP-300 Print Service (Manual Input) | ON (Manual Setting Service) | State=A4-paperlow, Duplex |

FIG.8B
EXAMPLE OF SERVICE TABLE 800

| Service ID 801 | Action 802 | Type 803 | href 804 | Service Title 805 | Local Service Flag 806 | extend 807 |
|---|---|---|---|---|---|---|
| 1 | print | image/* | https://Printservice.com/print.html | Cloud Print Service | | |
| 2 | | | | | | |
| 3 | | | | | | |
| 4 | | | | | | |

FIG.8C
CONTENT MANAGEMENT TABLE 820

| Image ID 821 | File 822 |
|---|---|
| 1 | image001.png |
| 2 | image002.png |

FIG. 8D

EXAMPLE OF Web Intents SETTING 830

| Setting ID 831 | Action 832 | Type 833 | Local Service Flag 834 | Priority in the Same Action and Type 835 | Local Service Search Processing 836 | Local Service Registration Processing 837 | Local Service Update Processing 838 |
|---|---|---|---|---|---|---|---|
| 1 | print | image/* |  | 4 | Perform Local Service Search | Register Local Service | Perform Local Service Update Processing |
| 2 | print | image/* | ON (LAN) | 1 | Do Not Perform Local Service Search | Register Local Service | Perform Local Service Update Processing |
| 3 | print | image/* | ON (Intra-device Service) | 2 | Perform Local Service Search | Register Local Service | Do Not Perform Local Service Update Processing |
| 4 | print | image/* | ON (Manual Setting Service) | 3 | Do Not Perform Local Service Search | Do Not Register Local Service | Do Not Perform Local Service Update Processing |
| 5 | share | * |  | 1 | Do Not Perform Local Service Search | Do Not Register Local Service | Do Not Perform Local Service Update Processing |

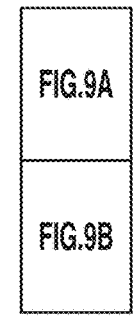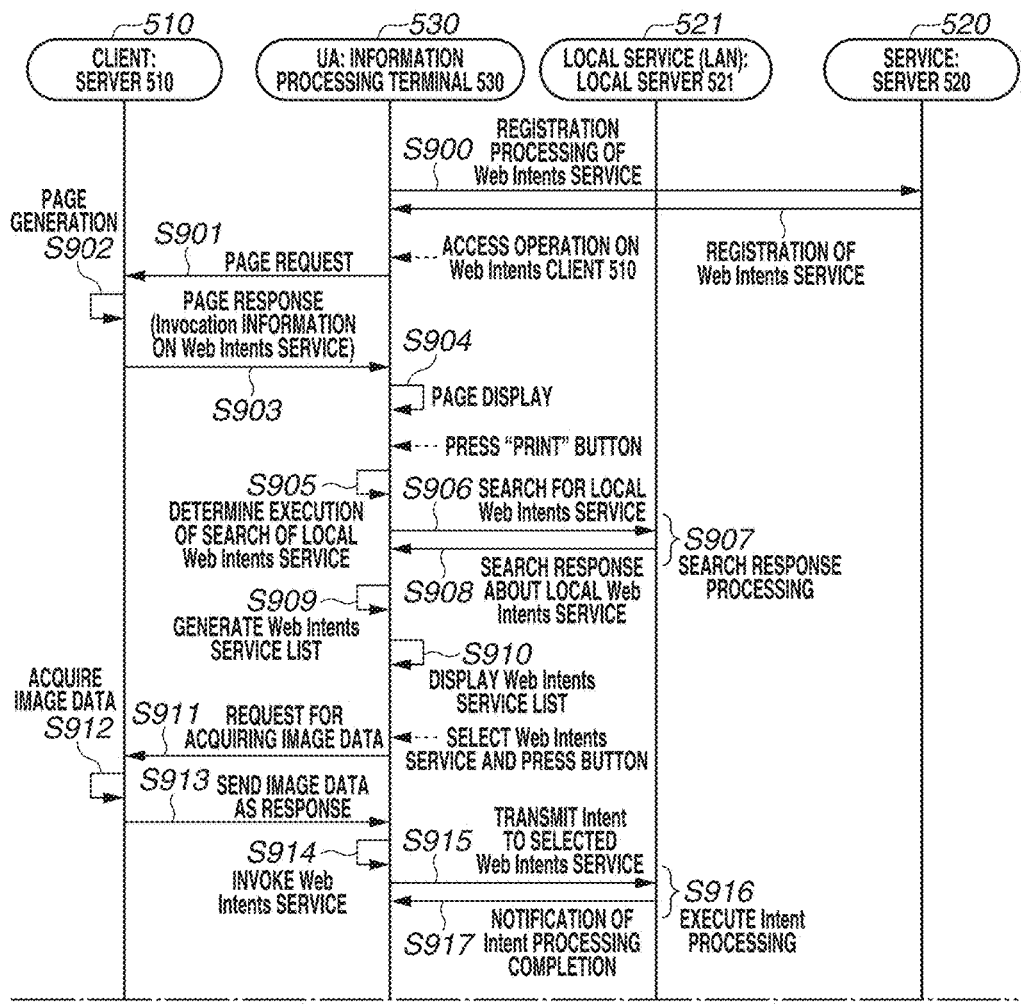

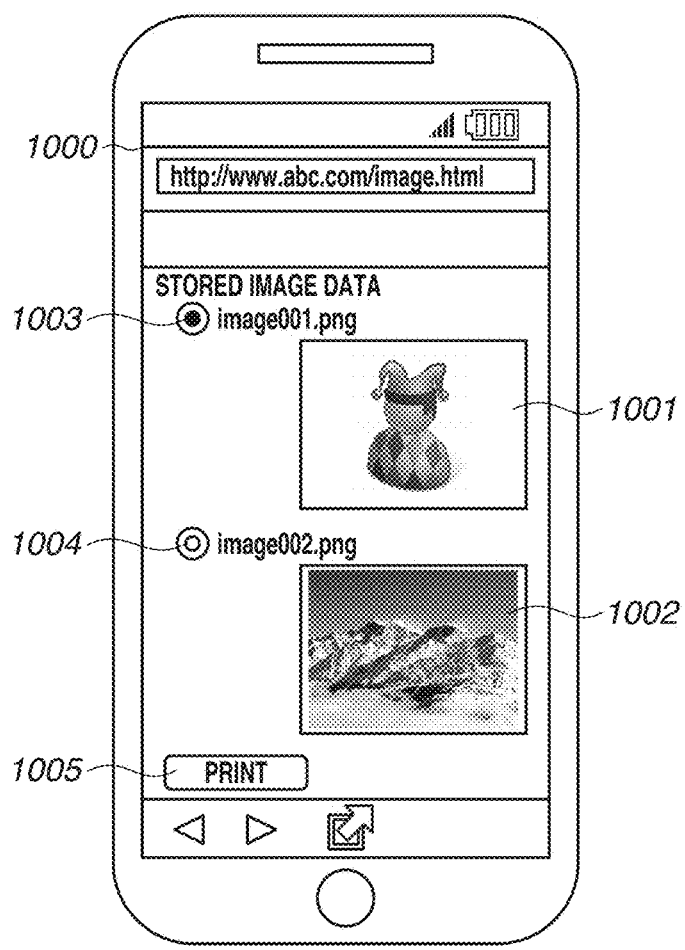

FIG. 11A

```
M-SEARCH * HTTP/1.1
S: uuid:xxxxxxxx-abcd-9876-1234-002244668800
Host: 239.255.255.250:reservedSSDPport
Man: "ssdp:discover"
ST:urn:schemas-webintents-org:service:WebIntents:1
MX: 3
```

FIG. 11B

```
HTTP / 1.1 200 OK
ST: urn:schemas-webintents-org:service:WebIntents:1
CACHE-CONTROL: max-age=900
USN: uuid:12345678-1234-2345-1234-123456789012::urn:schemas-webintents-org:service:WebIntents:1
LOCATION: http://192.168.1.10:57735/
action.webintents.org: http://webintents.org/print
type.webintents.org: image/*
href.webintents.org: /print.html
title.webintents.org: LBP-100 Print Service
disposition.webintents.org: background
Content-Length: 0
```

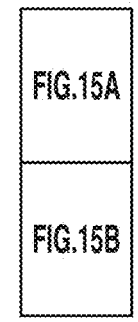
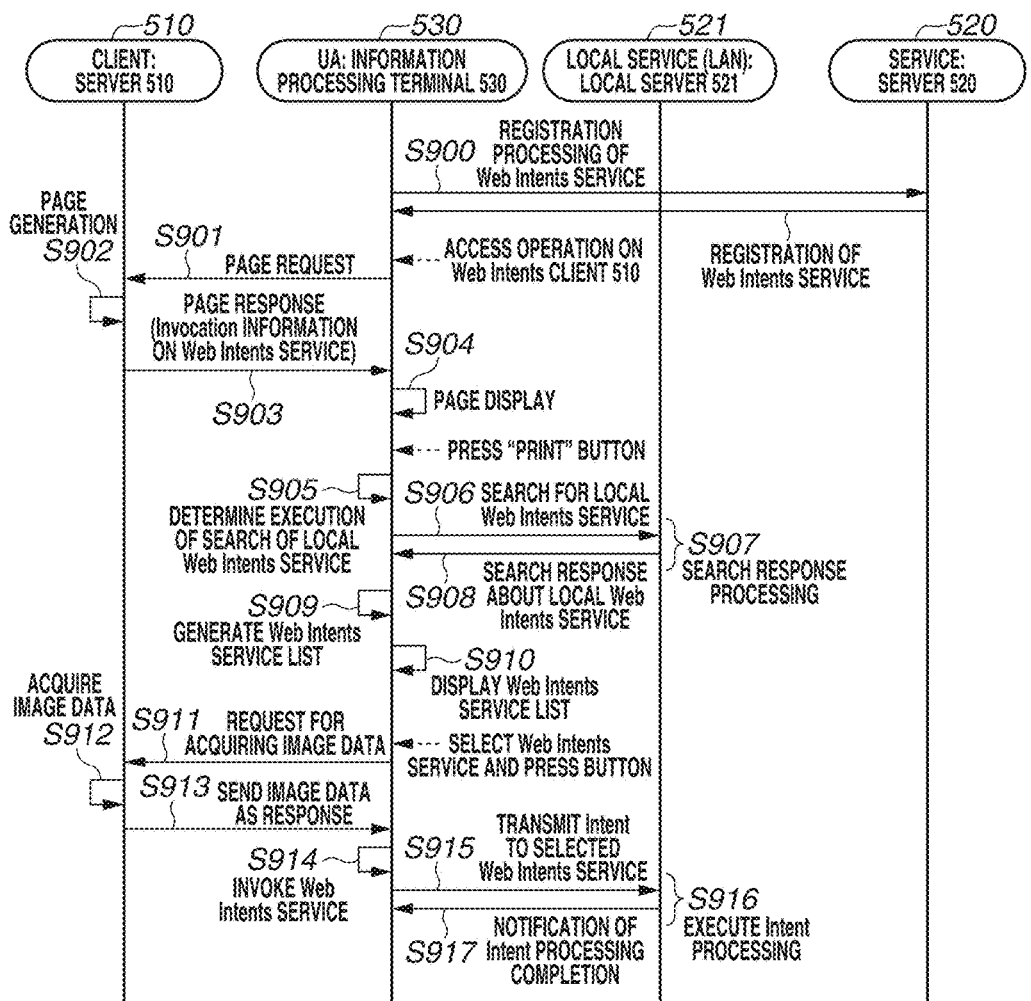

FIG.16A

```
<html>
  <head>
    <title>Printer service Registration </title>
  </head>
  <body>
    <intent
      action ="http://webintents.org/Print"
      type="image/*"
      state= "Ready"
      href = "printer-control.html"
      title="room 3 Printer"
      disposition="windows" />
  </body>
</html>
```
1601

FIG.16B

```
<html>
  <head>
    <title>Printer service Registration </title>
  </head>
  <body>
    <intent action ="http://webintents.org/print" type="application/pdf" state="NotReady" href = .... / >
    <intent action ="http://webintents.org/print" type="image/png, image/jpeg" state= "Ready" href = .... / >
  </body>
</html>
```
1602

FIG. 18A

EXAMPLE OF UPDATED SERVICE TABLE 800

| Service ID | Action | Type | href | Service Title | Local Service Flag | |
|---|---|---|---|---|---|---|
| 801 | 802 | 803 | 804 | 805 | 806 | 807 |
| 1 | print | image/* | https://Printservice.com/print.html | Cloud Print Service | | extend |
| 3 | print | image/* | https://localhost/Print2file.html | Print to File Service | ON (Intra-device Service) | State=colorprint |
| 4 | print | image/* | https://192.168.1.12/print.html | LBP-300 Print Service (Manual Input) | ON (Manual Setting Service) | State=A4-paperlow, Duplex |

FIG. 18B

EXAMPLE OF UPDATED SERVICE TABLE 800

| Service ID | Action | Type | href | Service Title | Local Service Flag | |
|---|---|---|---|---|---|---|
| 801 | 802 | 803 | 804 | 805 | 806 | 807 |
| 1 | print | image/* | https://Printservice.com/print.html | Cloud Print Service | | extend |
| 2 | print | image/* | https://192.168.1.10/print.html | LBP-100 Print Service | ON (LAN) | State=A4-paperlow, colorprint |
| 3 | print | image/* | https://localhost/Print2file.html | Print to File Service | ON (Intra-device Service) | State=colorprint |
| 4 | print | image/* | https://192.168.1.12/print.html | LBP-300 Print Service (Manual Input) | ON (Manual Setting Service) | State=A4-paperlow, Duplex |

INFORMATION PROCESSING TERMINAL AND CONTROL METHOD FOR PROCESSING BOTH SERVICE SEARCHED ON NETWORK AND SERVICE PROVIDED VIA SITE

BACKGROUND OF THE INVENTION

Field of the Invention

The present invention relates to a technology for using a service that a network device provides.

Description of the Related Art

Conventionally, in a case where processing is transferred between websites, the website that invokes a function has needed to know a function invoking method, such as an application programming interface (API) or Representational State Transfer (REST) interface, of the website that provides the function. Accordingly, to implement cooperation between different websites, the website that invokes a function has needed to perform its individual processing according to the respective invocation protocols.

There is also a scheme that allows cooperation with any web service (or any web application) without using a dedicated API. For example, there has been proposed a scheme called "Web Intents" for loosely coupling a web application that receives a service and a web application that provides the service by using runtime delayed binding to implement cooperation between the two web applications.

Web Intents allows a service provided on an Internet web page to be provided to users. Therefore, users cannot select a printer or the like connected to a local area network (LAN) in the same way as when selecting a service provided on an Internet web page.

Techniques for solving this issue include a technique discussed in Japanese Patent Application Laid-Open No. 2013-196356. In this technique, Universal Plug and Play (UPnP) is used to perform a local service search within a LAN, thus more extensively presenting, to users, options of an information processing service and enabling users to use various devices.

In the technique discussed in Japanese Patent Application Laid-Open No. 2013-196356, with regard to a search for local services, a Web Intents service is searched for with Simple Service Discovery Protocol (SSDP) that is extended in Web Intents. Since a search result is not registered with a user agent (UA), it is necessary to search for a local service every time an Invocation in Web Intents is received. Depending on circumstances, a great number of local services exist, so that the search result may include unnecessary local services for a user. Under such a circumstance, unnecessary local services for a user may be discovered by every search and may be displayed in a service list. Therefore, it may become hard for the user to find, from the service list, a service that the user wants to use.

Therefore, there has been desired a scheme that allows the user to readily select and use various services provided by network devices, such as services on the Internet and local services.

Furthermore, unlike services provided via the Internet, local services may vary in the state of provision of services. For example, in some cases, a communication error occurs because a device that provides a local service is powered off, or a service cannot be provided in such a case where the service cannot be executed due to the shortage of consumables. Therefore, even if a local service is registered with a UA, when the local service is selected by the user from the service list, the changed state of provision of the local service may make it impossible to use the local service.

SUMMARY OF THE INVENTION

The present invention features, among other things, a scheme that provides an optimum service list to the user about various services provided by network devices and allows the user to readily select and use a service.

According to an aspect of the present invention, an information processing terminal having a relay function for causing a client that manages data and a service that provides a function using the data managed by the client to cooperate with each other includes a first acquisition unit configured to acquire first function information, which is used to request a first service that a network device connected to a network provides, by searching for services via the network using a predetermined network protocol, a second acquisition unit configured to acquire second function information, which is used to request a second service, via a site of a network device that provides the second service, a registration unit configured to execute registration processing of the first function information acquired by the first acquisition unit and the second function information acquired by the second acquisition unit using the relay function, and a control unit configured to control display of a list of function information including the first function information and the second function information registered according to the registration processing, wherein, if function information that has previously been registered according to the registration processing has been found by a search for services via the network using the predetermined network protocol, the control unit updates display of the list according to a result of the search.

Further features of the present invention will become apparent from the following description of exemplary embodiments with reference to the attached drawings.

BRIEF DESCRIPTION OF THE DRAWINGS

FIG. 3 illustrates a HyperText Markup Language (HTML) document that is used to register functions of Web Intents.

FIG. 4 illustrates an HTML document that is returned from a client to a user agent (UA).

FIGS. 7A, 7B, 7C, and 7D illustrate configurations of software.

FIGS. 8A, 8B, 8C, and 8D illustrate examples of service tables, a content management table, and Web Intents setting, respectively.

FIGS. 10A and 10B illustrate examples of ECMAScript and a client screen, respectively.

FIGS. 11A and 11B illustrate examples of a local service search packet and a response packet, respectively.

FIGS. 16A and 16B illustrate examples of Web Intents extension information response packet.

FIGS. 18A and 18B illustrate examples of updated service tables according to the second exemplary embodiment.

DESCRIPTION OF THE EMBODIMENTS

Various exemplary embodiments, features, and aspects of the invention will be described in detail below with reference to the drawings.

<Basic Overall Concept>

Figure 1:
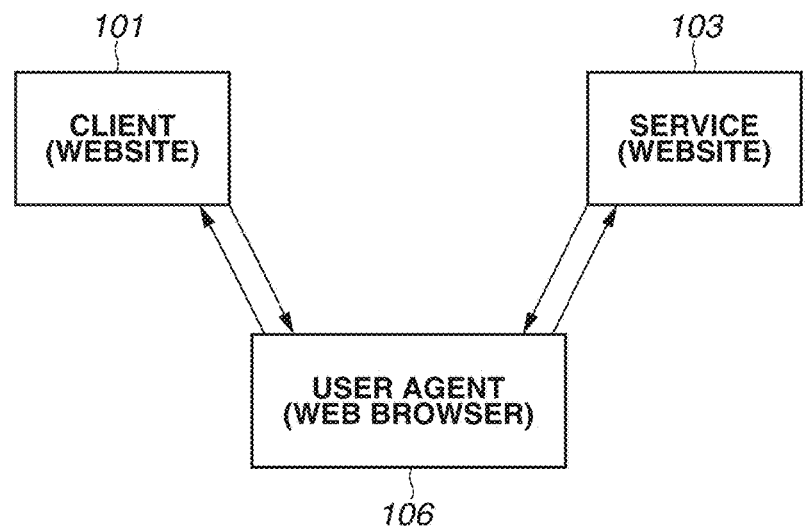
FIG. 1 illustrates an example of the entire configuration that implements Web Intents.

FIG. 1 illustrates an example of the entire configuration that implements Web Intents, which is an example of a framework for cooperating with any web service (or any web application) without using a dedicated application programming interface (API).

A Web Intents service (hereinafter referred to as a "service") 103 provides a service or function using the Intents technology. A Web Intents client (hereinafter referred to as a "client") 101 uses the service 103. A user agent (UA) 106 serves to pass a request from the client 101 to the service 103 and to pass a result from the service 103 to the client 101. The UA 106 can be said to be a relay function that executes a request and exchanges data between the client 101 and the service 103. Furthermore, function information used to invoke a function that the service 103 provides is registered, as Web Intents, with the UA 106.

For example, the client 101 is a website that manages data and is equipped with a button operable to invoke a service, and is configured to operate on a web server. The UA 106 is a web browser that displays the website, and is configured to operate on an information processing terminal, such as a personal computer. The service 103 is a website, with which the client 101 cooperates, that receives data managed by the client 101 via the UA 106 and processes the received data, and is configured to operate on a web server.

More specifically, in a case where a framework of Web Intents is applied to a social networking service (SNS), the following configuration is used. The client 101 is a website equipped with social buttons, such as "like", "check", and "share" buttons. The UA 106 is a web browser that displays the website. The service 103 is a website that receives posting of photos or comments managed by the client 101 in response to the press of the social button and constitutes a viewing site serving as a posting destination. Here, in a case where a user authentication or user operation is required for the service 103 to provide a function, the user performs an operation on the UA 106.

Furthermore, the UA 106 may be configured with, besides a web browser, an operating system (OS) or any application operating on an information processing terminal as long as it has a function for cooperating with a service, which is described below. Examples of the information processing terminal include a personal computer, a smartphone, a tablet computer, and a car navigation apparatus.

Moreover, the service 103 is not only a service provider on the Internet, such as the above-mentioned posting-destination service, but also may be a device as a service provider, such as a camera, an image forming apparatus, or a scanner, which is built in the information processing terminal. In addition, a peripheral device, such as an image forming apparatus, a scanner, or a network camera, which is connected to the UA 106 via a network, or a web service provided by a home electric appliance, such as a refrigerator or a television set, may be a service provider corresponding to the service 103.

Furthermore, also with regard to the client 101, any device or application built in an information processing terminal, a peripheral device or home electric appliance on a network, or a program running thereon may be a user for invoking a service.

Any combination of all or part of the client 101, the UA 106, and the service 103 may operate within the one and same system. More specifically, it may be considered that a document editing application having a function equivalent to a web browser operates as a configuration containing the client 101 and the UA 106.

Furthermore, examples of the hardware configuration of each apparatus that provides the function of the client 101, the UA 106, or the service 103 are described below with reference to FIGS. 6A and 6B.

<Web Intents Sequence Diagram and Example of Data>

Figure 2:
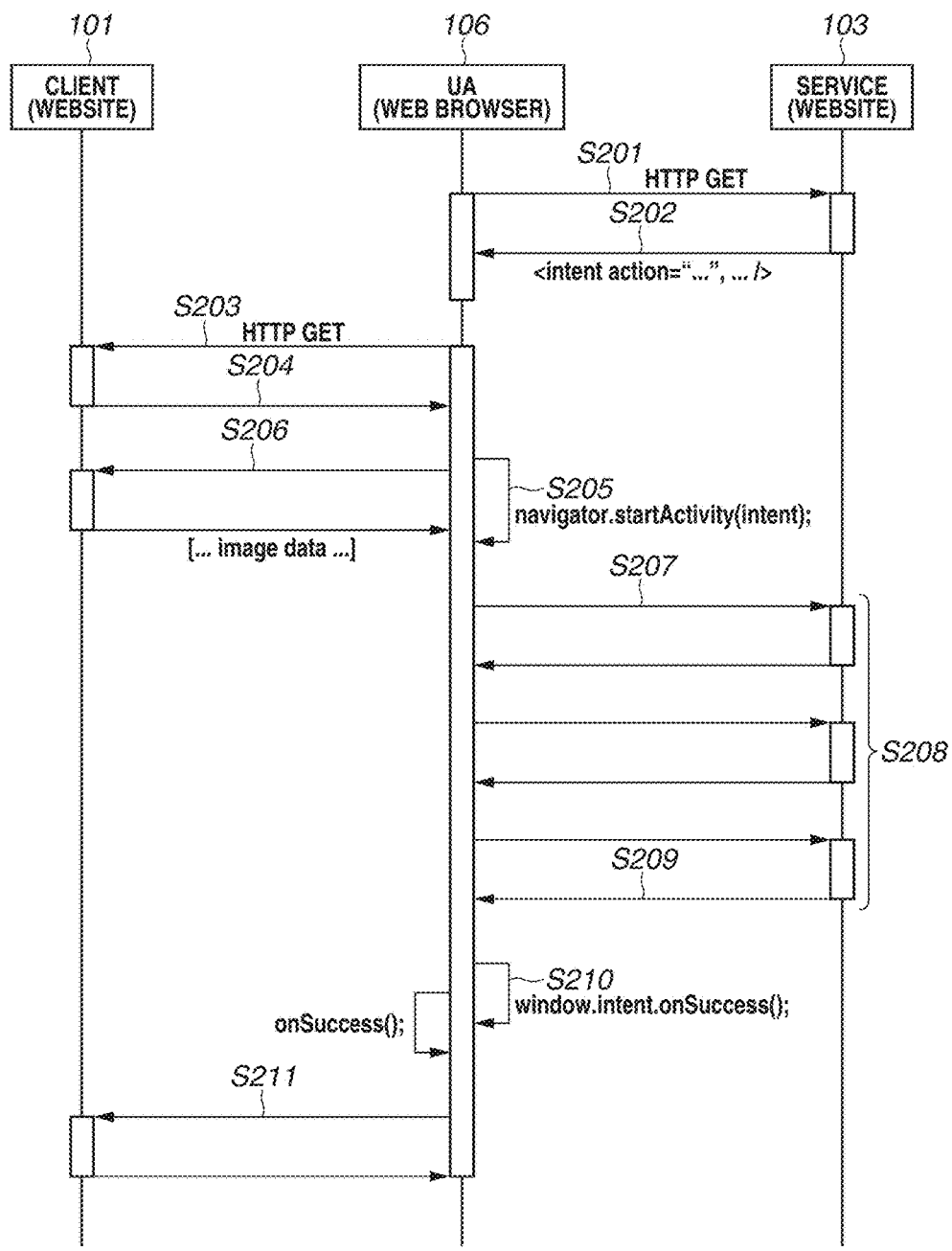
FIG. 2 is a sequence diagram illustrating a basic operation of Web Intents.

FIG. 2 is a sequence diagram illustrating a basic operation concerning a service providing function using Web Intents.

In step S201, the UA 106 accesses the service 103 in response to a user operation. In step S202, the service 103 returns, to the UA 106, a HyperText Markup Language (HTML) response including a registration markup used to request the UA 106 to register a function that the service 103 provides (a provided function). Now, the contents of the HTML response, which is returned from the service 103 to the UA 106, are described with reference to an example illustrated in FIG. 3.

FIG. 3 illustrates an example of an HTML document used to register a function in Web Intents.

Referring to FIG. 3, information specifying the provided function is described in the <intent> tag. The "action" element indicates the category of the provided function. The "type" element indicates the type of data that is able to be handled by the provided function. The "href" element indicates a connection destination (Uniform Resource Locator (URL)) of the provided function. The "title" element indicates the title of the provided function. The "disposition" element indicates how the provided function that has been invoked is displayed.

In the example illustrated in FIG. 3, the category of the provided function is "share", and the type of data that is able to be handled is "image data (image) of any format (*)". Furthermore, the connection destination is "share.html", and the title is "Share image using e-mail". Moreover, the "disposition" element indicates that the provided function is displayed at another window via the UA 106.

Furthermore, examples of the category of the provided function include "share", "edit", "view", "pick", "subscribe", "save", "browser", and "print". The category "share" indicates sharing of data, the category "edit" indicates editing of data, the category "view" indicates viewing of data, the category "pick" indicates the acquisition of data from an external service, the category "subscribe" indicates the subscription of data, the category "save" indicates storing of data, and the category "print" indicates printing of data.

The UA 106, when receiving the response in step S202, checks with the user whether to register the provided function of the service 103 with the UA 106. For example, if the UA 106 is a web browser, the UA 106 displays a pop-up window to prompt the user to select whether to register the provided function. If the user selects to register the provided function as Web Intents, the UA 106 executes registration processing for storing the information received in step S202 into the inside thereof. More specifically, the received information is stored into a storage region of an information processing terminal in which the UA 106 operates, and is registered, as Web Intents, with the UA 106.

In step S203, the UA 106 accesses the client 101 in response to a user operation. In step S204, the client 101 returns, to the UA 106, an HTML document containing information indicating that the client 103 uses the provided function of the service 103 (Web Intents). For example, in a case where a "share" button is displayed together with an image on a website serving as the client 101, the website returns, to the UA 106, an HTML document containing ECMAScript such as that illustrated in FIG. 4. Now, the contents of the HTML document, which is returned from the client 101 to the UA 106, are described with reference to the example illustrated in FIG. 4.

FIG. 4 illustrates an example of the HTML document, which is returned from the client 101 to the UA 106.

As illustrated in FIG. 4, ECMAScript indicates that, if a button having an ID "share-photo" in HTML is clicked, a specified unnamed function is executed. The unnamed function first creates a new Intent object and, then, invokes a startActivity( ) function with the new Intent object set as an argument. After executing the startActivity( ) function, the UA 106 extracts, from among Web Intents registered with the UA 106 itself, the ones with which the specified Intent object coincides in "action" and "type", and displays the extracted ones in list form, thus prompting the user to make a selection. Furthermore, the UA 106 acquires image data, which is stored in the client 101, by executing a getImageFrom( ) function invoked within the unnamed function.

In step S204, the client 101 returns, to the UA 106, an HTML document containing, for example, an image, a "share" button, and ECMAScript illustrated in FIG. 4. The UA 106, when receiving the HTML response from the client 101, displays the received content to the user. In step S205, the UA 106, when detecting the press of the "share" button on the display screen by the user, executes ECMAScript for activating Web Intents as mentioned in the foregoing, and, then in step S206, acquires image data stored in the client 101. Furthermore, when detecting the press of the "share" button in the above-mentioned step S205, the UA 106 displays a list of Web Intents registered with the UA 106 itself. When detecting, from the list, the user's selection of Web Intents indicating the provided function of the service 103, then in step S207, the UA 106 transmits a HyperText Transfer Protocol (HTTP) request to the service as selected. In this instance, the UA 106 includes the content of an Intent object created by ECMAScript illustrated in FIG. 4 into the transmitted data.

In step S208, the service 103 extracts an Intent object from the HTTP request received in the above-mentioned step S207, and implements the use of the selected provided function (here, "share" of image data stored in the client 101) by interacting with the user via the UA 106. For example, when the user visits a website in which an image and a share button are displayed and presses the share button, a service list is displayed on a pop-up window. Then, if a web mail service is selected, a new mail with image data attached thereto is created, so that an e-mail can be sent by the user.

When the processing has been completed, in step S209, the service 103 returns, to the UA 106, a response containing ECMAScript for transmitting a processing result to the client 101. In step S210, the UA 106 executes ECMAScript contained in the response received in step S209, and invokes a callback function onSuccess( ) specified by the argument of the startActivity( ) function in step S205. In step S211, the UA 106 returns, to the client 101, the processing result according to the callback function onSuccess( ).

An example of using a web mail function is described with reference to the sequence illustrated in FIG. 2. First, the user uses a web browser (the UA 106) to visit a site in which an invocation button for Web Intents of a web storage (the client 101) that manages photo data is prepared, and presses the invocation button. Then, the web browser (the UA 106) displays a pop-up window containing a list of registered services. Here, if the user has selected a web mail function, a website (the service 103) that provides the web mail function is displayed on another window, on which a new mail with photo data attached thereto is created as a processing result.

The above-described processing enables the client 101 to invoke, via the UA 106, a function of Web Intents (in this example, "share" of image data) that the service 103 provides.

<Configuration Example of Network, Peripheral Device, and Network Service According to the Present Exemplary Embodiment>

Figure 5:
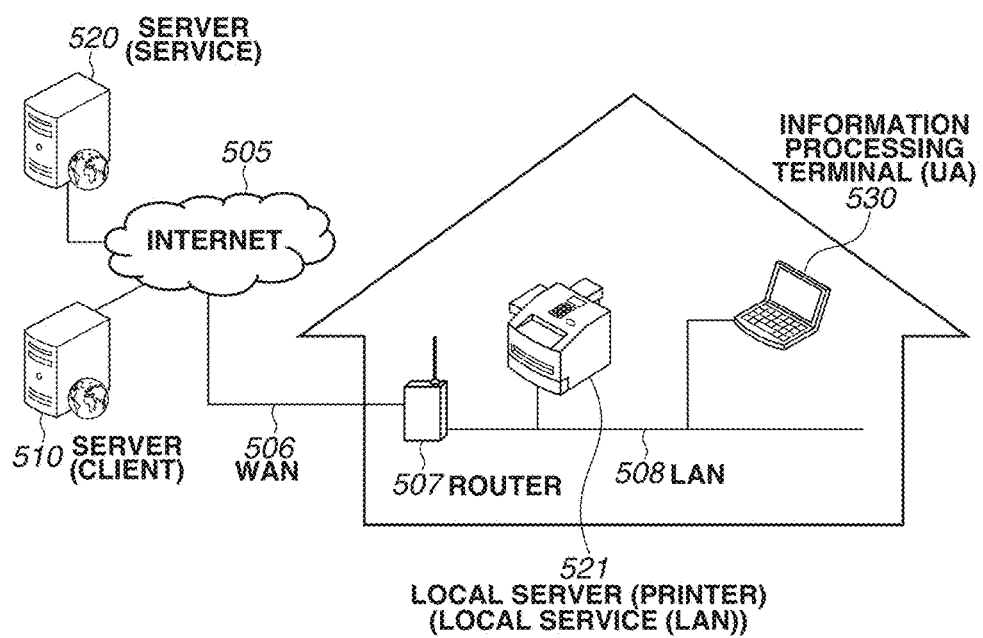
FIG. 5 illustrates an example of a configuration of a system according to an exemplary embodiment of the present invention.

FIG. 5 illustrates a Configuration Example of a system according to an exemplary embodiment of the present invention.

As illustrated in FIG. 5, in the system, an information processing terminal 530 and a local server (printer) 521, which are interconnected via a local area network (LAN) 508, are connected to a wide area network (WAN) 506 across a router 507. Furthermore, the system further includes a server 510, which provides the function of at least one client 101, and a server 520, which provides the function of at least one service 103. The server 510 and the server 520, which are connected to the Internet 505, provides a service via the Internet 505. The information processing terminal 530 is connected to the server 510 and the server 520 via the WAN 506 and the Internet 505 across the router 507.

In the present exemplary embodiment, services (a service and a local service) corresponding to the above-described service 103 are provided by the server 520 and the local server 521. However, the present invention can also be applied to a case where service functions are provided by three or more servers.

The server 510, which provides the function of the above-described client 101, generates a processing request for a service or local service. The server 520 and the local server 521 are equipped with web applications that provide a service and a local service (LAN), respectively, which correspond to the service 103, and provide services or functions using the Web Intents technology.

As mentioned above, the local server 521 is a server connected to the LAN 508. While, in the present exemplary embodiment, an example is described in which the local server 521 is a printer, the local server 521 may be another configuration having a Web Intents service function, such as a general-purpose personal computer or home information appliance. Furthermore, the LAN 508 may be wired or wireless.

The information processing terminal 530 is a computer on which a web browser that provides the function of the above-mentioned UA 106 is installed. In addition, the information processing terminal 530 is internally equipped with a web application that provides the function of a local service (refer to a local service (an intra-device service) illustrated in FIG. 7D, which is described below). The server 510, the server 520, and the information processing terminal 530 each have the configuration of a general-purpose computer.

While, in the present exemplary embodiment, the information processing terminal 530 is illustrated as a general-purpose computer, the present invention can also be applied to cases where processing is performed by another form of information processing terminal, a tablet-type computer, or a smartphone.

Figure 6A:
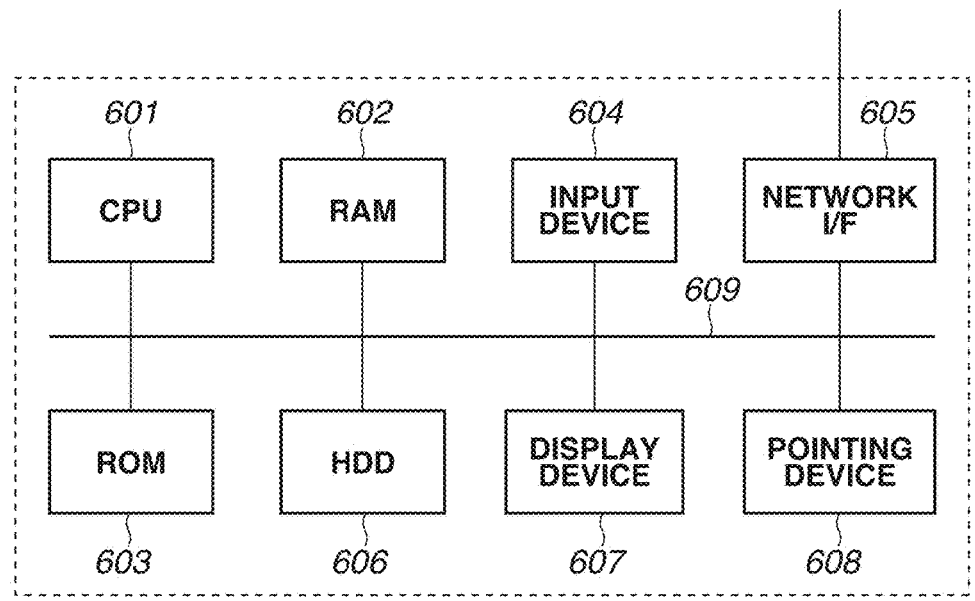
FIGS. 6A and 6B illustrate configurations of hardware.
Figure 6B:
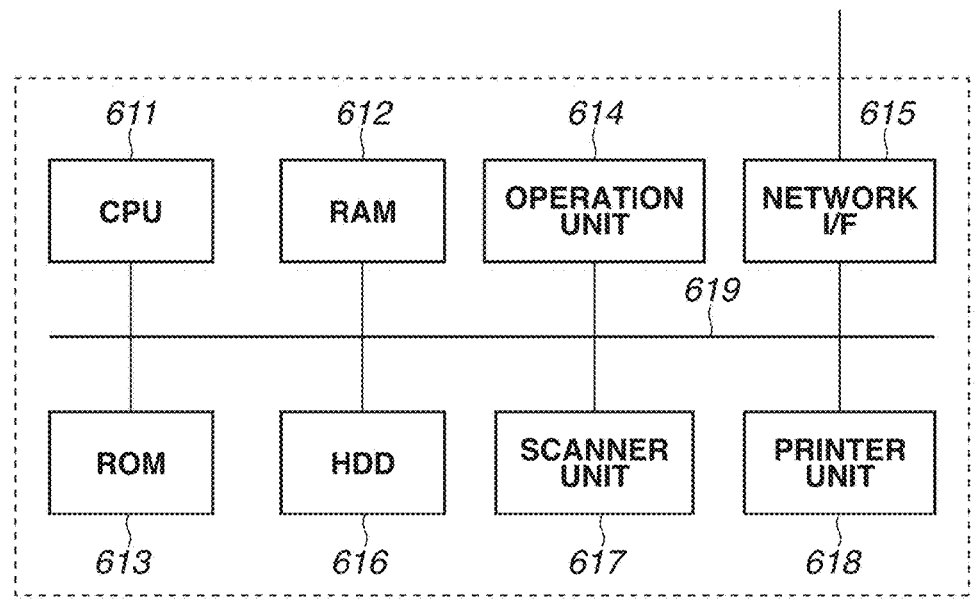

FIGS. 6A and 6B are hardware block diagrams illustrating devices and units constituting the system according to the present exemplary embodiment.

FIG. 6A is a block diagram illustrating an example of the hardware configuration of each of the servers 510 and 520 and the information processing terminal 530.

As illustrated in FIG. 6A, a central processing unit (CPU) 601, a random access memory (RAM) 602, a read-only memory (ROM) 603, a network interface (I/F) 605, and a hard disk drive (HDD) 606 are interconnected via a system bus 609 in such a way as to be able to communicate with one another. Furthermore, a display device 607, such as a liquid crystal display (LCD), an input device 604, such as a keyboard, and a pointing device 608, such as a mouse or a touch panel, are also interconnected via the system bus 609 in such a way as to be able to communicate with one another.

The ROM 603 or the HDD 606 stores control programs, such as an operating system and various application programs. The CPU 601 reads and executes the control programs as appropriate from the ROM 603 or the HDD 606, thus functioning as a computer. Moreover, the CPU 601 displays various pieces of information via the display device 607, and receives user's instructions, etc., from the input device 604 or the pointing device 608. In addition, the CPU 601 performs communication with other apparatuses via the network interface 605.

FIG. 6B is a block diagram illustrating an example of the hardware configuration of the local server 521. In the example illustrated in FIG. 6B, the local server 521 is configured as a multifunction peripheral (MFP).

As illustrated in FIG. 6B, a CPU 611, a RAM 612, a ROM 613, a network interface (I/F) 615, and an HDD 616 are interconnected via a system bus 619 in such a way as to be able to communicate with one another. Furthermore, an operation unit 614, a scanner unit 617, and a printer unit 618 are also interconnected via the system bus 619 in such a way as to be able to communicate with one another.

The ROM 613 or the H1D 616 stores control programs, such as an operating system and various application programs. The CPU 611 reads and executes the control programs as appropriate from the ROM 613 or the HDD 616, thus functioning as a multifunction peripheral. Moreover, the CPU 611 displays various pieces of information via the operation unit 614, and receives user's instructions, etc., from the operation unit 614. In addition, the CPU 611 performs communication with other apparatuses via the network interface 615.

The operation unit 614, which is composed of a button and a display device, a liquid crystal display screen equipped with a touch panel, or a combination thereof, displays information received from the CPU 611 to the user and notifies the CPU 611 of user's inputs.

The scanner unit 617 reads the image of an original, and outputs image data corresponding to the read original image to the printer unit 618 in response to an instruction from the user or stores the image data into the HDD 616 or the like. Furthermore, the scanner unit 617 is able to transmit image data to an external apparatus connected to a network via the network I/F 615.

The printer unit 618 prints an original image read by the scanner unit 617 or image data stored in the HDD 616. Furthermore, the printer unit 618 prints a print job transmitted from an external apparatus connected to the network.

Furthermore, the CPU 611 performs intercommunication with other information apparatuses on the network via the network I/F 615, and controls the provision of a local service (LAN), such as a web print function. In addition, the hardware configuration of the local server 521 may be designed to contain an additional CPU to be used to provide a service.

FIGS. 7A, 7B, 7C, and 7D are block diagrams illustrating examples of software configurations of the server 510, the server 520, the local server 521, and the information processing terminal 530, respectively.

Figure 7A:
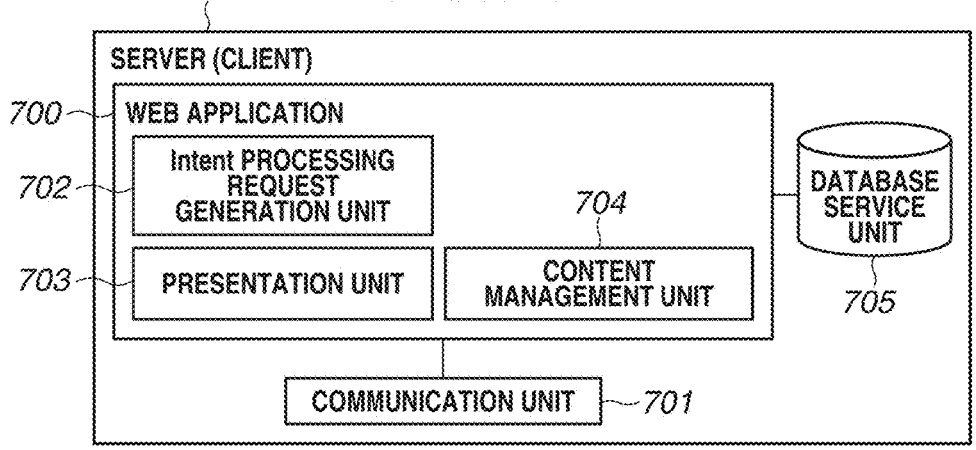

FIG. 7A illustrates an example of the software configuration of the server 510, which provides the function of the client 101.

In the server 510, a web application 700 and each processing unit exist as files stored in the HDD 606 of the server 510. The web application 700 and each processing unit are program modules, which, when executed, are loaded onto the RAM 602 and executed by an OS or another processing unit using each processing unit.

The web application 700 is, for example, an application that provides a storage service for storing image data. The web application 700 is implemented as a program that executes processing in response to a HyperText Transfer Protocol (HTTP) request. The web application 700 includes an Intent processing request generation unit 702, a presentation unit 703, and a content management unit 704.

The Intent processing request generation unit 702 is a software module that generates ECMAScript, which is a processing request for Intent. The presentation unit 703 is a software module that generates an HTML document according to a page acquisition request or the like received via a communication unit 701. The content management unit 704 is a software module that acquires content from the HDD 606 via a database service unit 705 according to a request from the presentation unit 703 and stores the acquired content.

The database service unit 705 is a software module that performs storage and fetch of content into and from the HDD 606 according to a request from another processing unit. Furthermore, the database service unit 705 manages a content management table 820 such as that illustrated in FIG. 8C, which is described below. Moreover, the database service unit 705 may be located on an apparatus different from the server 510. The web application 700 such as that described above is implemented by the CPU 601 of the server 510 reading programs from the HDD 606 or the like onto the RAM 602 and executing the programs.

Figure 7B:
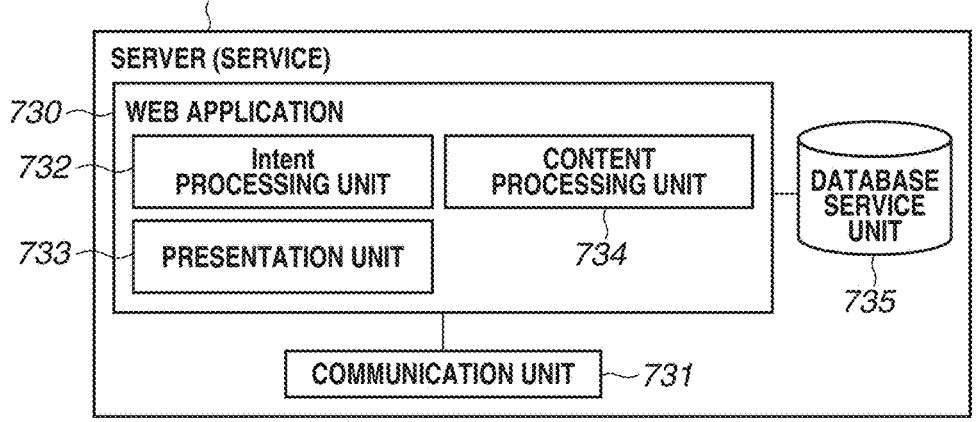

FIG. 7B illustrates an example of the software configuration of the server 520, which provides a service corresponding to the service 103.

In the server 520, a web application 730 and each processing unit exist as files stored in the HDD 606 of the server 520. The web application 730 and each processing unit are program modules, which, when executed, are loaded onto the RAM 602 and executed by an OS or another processing unit using each processing unit.

The web application 730 is an application that provides a storage service for storing image data. Furthermore, the web application 730 has the function to provide a service using the Intents technology. Moreover, the web application 730 is implemented as a program for executing processing in response to an HTTP request. The web application 730 includes an Intent processing unit 732, a presentation unit 733, and a content processing unit 734.

The Intent processing unit 732 is a software module that analyzes and processes an Intent object. The presentation unit 733 is a software module that generates an HTML document according to a page acquisition request or the like received via a communication unit 731. The content processing unit 734 is a software module that performs processing on content according to an instruction received from the Intent processing unit 732. For example, the content processing unit 734 is a software module that edits image data or stores content into the HDD 606 via a database service unit 735 according to a request.

The database service unit 735 performs storage and fetch of data according to a request from another processing unit. Moreover, the database service unit 735 may be located on an apparatus different from the server 520. The web application 730 such as that described above is implemented by the CPU 601 of the server 520 reading programs from the HDD 606 or the like onto the RAM 602 and executing the programs.

Figure 7C:
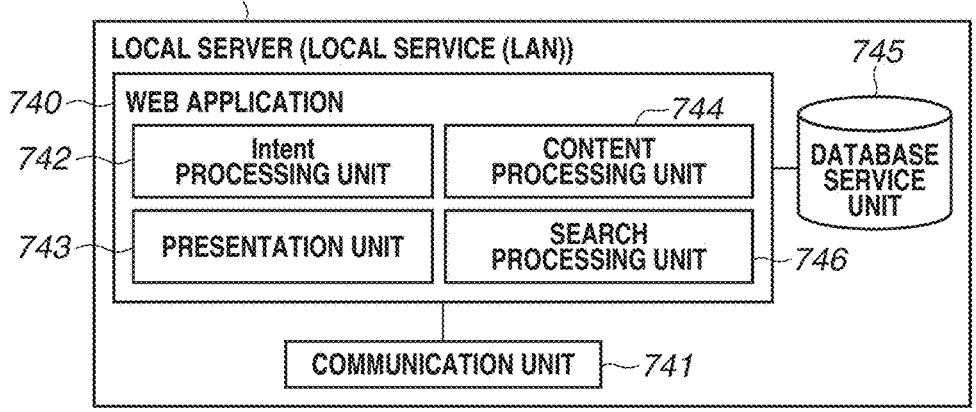

FIG. 7C illustrates an example of the software configuration of the local server 521, which provides a local service (LAN) corresponding to the service 103.

In the local server 521, a web application 740 and each processing unit exist as files stored in the HDD 616 of the local server 521. The web application 740 and each processing unit are program modules, which, when executed, are loaded onto the RAM 612 and executed by an OS or another processing unit using each processing unit.

The web application 740 is an application that provides a print service for image data. Furthermore, the web application 740 has the function to provide a service using the Intents technology. Moreover, the web application 740 is implemented as a program for executing processing in response to an HTTP request. The web application 740 includes an Intent processing unit 742, a presentation unit 743, a content processing unit 744, and a search processing unit 746.

The Intent processing unit 742 is a software module that analyzes and processes an Intent object. The presentation unit 743 is a software module that generates an HTML document according to a page acquisition request received via a communication unit 741. The content processing unit 744 is a software module that performs processing on content according to an instruction received from the Intent processing unit 742. For example, the content processing unit 744 is a software module that prints content via a print service unit (not illustrated) according to a print request for an image.

A database service unit 745 performs storage and fetch of data according to a request from another processing unit. Furthermore, the database service unit 745 may be located on an apparatus different from the local server 521. The search processing unit 746 processes a search request made using a predetermined network protocol, such as Simple Service Discovery Protocol (SSDP), received from a search unit 759 of the information processing terminal 530, which is described below. The network protocol to be used for search processing is not limited to SSDP.

The web application 740 such as that described above is implemented by the CPU 611 of the local server 521 reading programs from the HDD 616 or the like onto the RAM 612 and executing the programs.

FIG. 7D illustrates an example of the software configuration of the information processing terminal 530, which provides the function of the UA 106.

In the information processing terminal 530, a web browser 750, a web application 760, and each processing unit exist as files stored in the HDD 606 of the information processing terminal 530. The web browser 750, the web application 760, and each processing unit are program modules, which, when executed, are loaded onto the RAM 602 and executed by an OS or another processing unit using each processing unit.

The web browser 750 includes a communication unit 751, an analysis unit 752, a display unit 753, a service information input-output unit 754, a service information management unit 755, a service determination unit 756, a script processing unit 757, and a service information storage unit 758.

The communication unit 751 transmits an HTTP request message to an external apparatus in response to a request received from another processing unit. Furthermore, the communication unit 751 is a software module that receives an HTTP response message from the external apparatus and informs the analysis unit 752 of the content of the HTTP response message.

The analysis unit 752 is a software module that analyzes an HTML document. Furthermore, the analysis unit 752 also analyzes ECMAScript, which is an Intent processing request. The display unit 753 is a software module that renders an HTML document. Furthermore, the display unit 753 displays a screen used to receive selection of a service in response to a request from another processing unit.

The service information input-output unit 754 performs reception analysis of "action" in the Web Intents script or "type" indicating data type or generation of transmitted data from ECMAScript analyzed by the analysis unit 752. The service information management unit 755 is a software module that acquires information for identifying a registered service from the service information storage unit 758, which is described below, or stores the acquired information.

The service determination unit 756 determines the necessity of search based on "action" and "type" of the Intents script in Web Intents processing that is in process of execution. When determining the necessity, the service determination unit 756 uses Web Intents setting such as that illustrated in FIG. 8D (the details of which are described below). When the script processing unit 757 has determined via the service determination unit 756 that it is necessary to perform a search, the search unit 759 performs search processing.

The service information storage unit 758 manages data, and performs storage and fetch of data according to a request from the service information management unit 755. Furthermore, the service information storage unit 758 stores a service table 800 such as that illustrated in FIG. 8A or 8B, which is described below. The search unit 759 receives a search request from the script processing unit 757 and searches for a local service on the LAN 508.

Furthermore, the information processing terminal 530 includes a web application 760 that provides the function of a local service (local service (intra-device service)). The web application 760 is similar to the web application 730. More specifically, the Intent processing unit 742, the presentation unit 743, the content processing unit 744, the search processing unit 746, and the database service unit 745 are similar to the Intent processing unit 762, the presentation unit 763, the content processing unit 764, the search processing unit 766, and the database service unit 765, respectively. The content processing unit 764 is, for example, a software module that edits image data or stores content into the HDD 606 via the database service unit 765 in response to a request.

The web browser 750 and the web application 760 such as those described above are implemented by the CPU 601 of the information processing terminal 530 reading programs from the HDD 606 or the like onto the RAM 602 and executing the programs.

FIGS. 8A, 8B, 8C, and 8D illustrate examples of the service table 800, the content management table 820, and the Web Intents setting 830.

FIGS. 8A and 8B illustrate examples of the service table 800, which the web browser 750 of the information processing terminal 530 stores in the service information storage unit 758 to manage services registered with the web browser 750 itself. FIGS. 8A and 8B illustrate different registration examples of the service table 800.

The service table 800 illustrated in FIG. 8A or 8B is stored in the service information storage unit 758 of the information processing terminal 530 and is managed by the service information management unit 755. In the service table 800, there are registered function information (items 801 to 805) for invoking a function that each service provides and information (items 806 and 807) characteristic in the present exemplary embodiment. The details of the respective items are described as follows.

An item "Service ID" 801 is an identifier (ID) for uniquely identifying a service within the web browser 750. An item "Action" 802 indicates the category of a provided function that a service or a local service provides (what function or service the service provides). An item "Type" 803 indicates the type of data (the format of data) that is able to be handled by the item "Action" 802. An item "href" 804 indicates the Uniform Resource Locator (URL) of a service or a local service. An item "title" 805 indicates the title of a service or a local service.

Furthermore, an item "local service Flag" 806 is information for discriminating between a service registered from a server such as that described in steps S201 and S202 illustrated in FIG. 2 and a service found by search. A service with the item "local service Flag" 806 ON corresponds to a service found by search. "ON (LAN)" is stored in the item "local service Flag" 806 of a local service found by search on a LAN. Furthermore, "ON (Intra-Device Service)" is stored in the item "local service Flag" 806 of a local service found by search within the information processing terminal 530. Moreover, "ON (Manual Setting Service)" is stored in the item "local service Flag" 806 of a local service registered manually by the user.

An item "extend" 807 indicates service extension information acquired from search response information during searching or acquired from Web Intents extension information after searching. In the case of a local service registered manually by the user, information input by the user during registration is stored in the item "extend" 807.

The information processing terminal 530 is able to issue an Intent processing request to each service or local service by referring to the service table 800 such as that described above via the web browser 750.

FIG. 8C illustrates an example of the content management table 820, which is used to manage image data that the web application 700 of the server 510 handles.

The content management table 820 is stored in the HDD 606 included in the server 510 and is managed by the database service unit 705. An item "ImageID" 821 is an ID for uniquely identifying image data within the web application 700. An item "File" 822 represents the file name of image data. The server 510 is able to acquire image data from the HDD 606 via the content management unit 704 by referring to the content management table 820.

FIG. 8D illustrates an example of Web Intents setting 830. An item "Setting ID" 831 is an ID used for the service determination unit 756 of the web browser 750 to uniquely determine a determination condition. An item "Action" 832 indicates the category of a provided function that a service or a local service provides (what function or service the service provides). An item "Type" 833 indicates the type of data (the format of data) that is able to be handled by the item "Action" 832. Specifications of the item "Type" 833 are represented by "Content-Type" of RFC5322, RFC822, and RFC2822. An item "Local Service Flag" 834 represents the same flag as the item "local service Flag" 806.

In a case where services coincident with each other in the item "Action" 832, the item "Type" 833, and the item "local service Flag" 834 are registered in the service table 800, the service determination unit 756 performs local service search processing 836, local service registration processing 837, and local service update processing 838 according to the Web Intents setting 830.

Furthermore, in a case where a plurality of settings having the same items "Action" 832 and "Type" 833 is registered, the service determination unit 756 determines the presence or absence of execution of processing (search, registration, and update) based on the setting highest in order of priority in an item "Priority in the Same Action and Type" 835 among the settings having the same items "Action" 832 and "Type" 833. In other words, the values of the item "Priority in the Same Action and Type" 835 indicate which setting is to be prioritized in a case where a plurality of settings having the same items "Action" 832 and "Type" 833 is registered in the Web Intents setting 830.

An item "Local Service Search Processing" 836 indicates a setting for determining whether to perform local service search processing in a case where services coincident with each other in the item "Action" 832, the item "Type" 833, and the item "local service Flag" 834 are previously registered in the service table 800. An item "Local Service Registration Processing" 837 indicates a setting for determining whether to register a search result in the service table 800 in a case where the local service search processing has been performed. An item "Local Service Update Processing" 838 indicates a setting for determining whether to perform local service update processing in a case where the local service search processing has not been performed. The details of the item "Local Service Update Processing" 838 are described in a second exemplary embodiment, which is described below.

Thus, in the Web Intents setting illustrated in FIG. 8D, up to the registration state of local services in the service table 800, the determination "Perform Local Service Search" or the determination "Do Not Perform Local Service Search" is settable. Furthermore, in the Web Intents setting, in a case where the local service search is performed, the presence or absence of registration of a processing result in the service table 800 is settable. Moreover, in the Web Intents setting, in a case where the local service search is not performed, the presence or absence of execution of update processing of service extension information including the state of a local service is settable.

These setting values of the Web Intents setting do not need to include all of the items. Only items with setting values set are used for the determination processing by the service determination unit 756 (see step S1305 illustrated in FIG. 13, which is described below).

Furthermore, in a case where no service that is able to process a request is registered in the service table 800 or in a case where there is no Web Intents setting corresponding to a request, the service determination unit 756 determines to search for a local service and then to register the local service found by search.

The following describes, with reference to the sequence diagram of FIG. 9, an operation in which the information processing terminal 530 accesses a website provided by the server 510 and relays an Intent processing request to a local service provided by the local server 521.

Figure 9B:
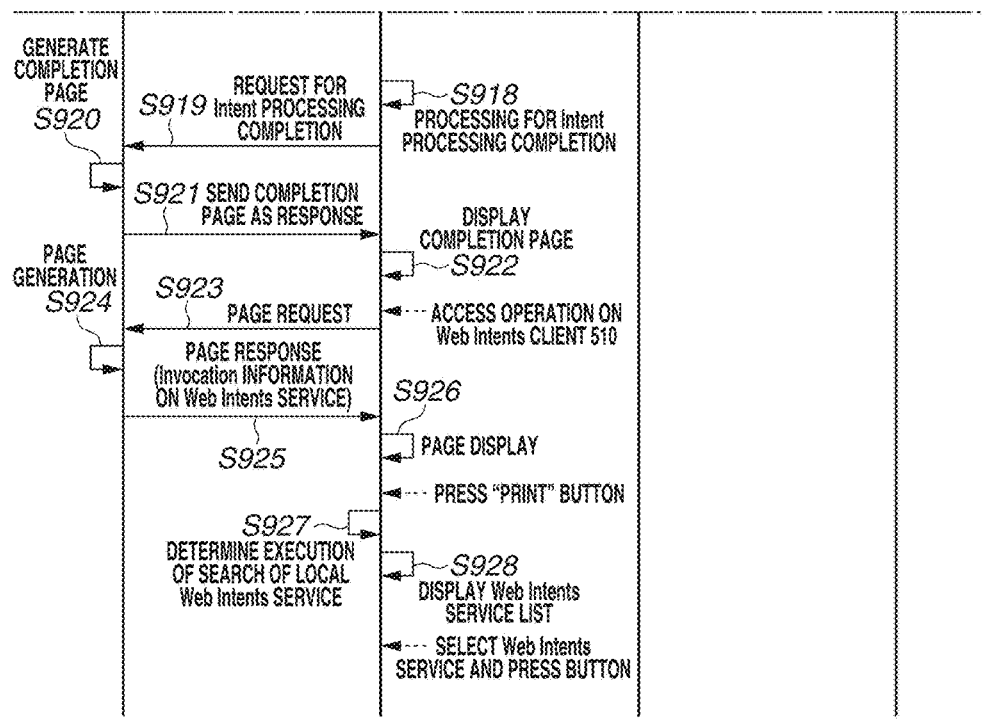
FIG. 9, which is composed of FIGS. 9A and 9B, is a sequence diagram according to a first exemplary embodiment.

FIG. 9, which is composed of FIGS. 9A and 9B, is a sequence diagram illustrating an example of an operation concerning the provision of a service using Web Intents according to the first exemplary embodiment. While FIG. 9 illustrates only a sequence for searching for a local service (LAN) and requesting the local service (LAN) to perform processing, a similar sequence can also be applied to a local service (intra-device service).

In step S900, the web browser 750 of the information processing terminal 530 registers, with the service information storage unit 758, a service requested to be registered from the web application 730 of the server 520. For example, supposing that the service table 800 at this time is in such a state as that illustrated in FIG. 8B, the operation is performed as follows.

When receiving such a user operation that the user enters, into an address bar or the like, the URL of the web application 700 of the server 510 (client), the web browser 750 of the information processing terminal 530 performs processing in step S901. In step S901, the web browser 750 transmits a page request as an HTTP request message to the server 510, serving as the client 101, via the communication unit 751.

When receiving the page request transmitted from the information processing terminal 530, the web application 700 of the server 510 performs processing in step S902. In step S902, the web application 700 of the server 510 generates a page. In step S903, the web application 700 of the server 510 sends the page generated in step S902, as an HTTP response message, to the web browser 750 of the information processing terminal 530 (Invocation processing).

When receiving the page sent as a response from the server 510, the web browser 750 of the information processing terminal 530 performs processing in step S904. In step S904, the display unit 753 of the web browser 750 of the information processing terminal 530 displays the received page. More specifically, the analysis unit 752 analyzes an HTML document corresponding to the page, and the display unit 753 performs rendering to display the received page. Now, a screen displayed in step S904 is described with reference to FIGS. 10A and 10B.

FIGS. 10A and 10B are diagrams used to describe a screen displayed in step S904 illustrated in FIG. 9.

FIG. 10A illustrates an example of ECMAScript described in an HTML document that is generated by the web application 700 of the server 510 in step S902 and is displayed by the web browser 750 of the information processing terminal 530 in step S904. The content illustrated in FIG. 10A is similar to that illustrated in FIG. 4, and, therefore, the detailed description thereof is omitted.

FIG. 10B illustrates an example of a screen displayed by the web browser 750 of the information processing terminal 530 in step S904.

A screen 1000 is displayed by the display unit 753 of the web browser 750. Image data "image001.png" and image data "image002.png are displayed as images 1001 and 1002, respectively. Radio buttons 1003 and 1004 are operable to select the images 1001 and 1002, respectively.

A "PRINT" button 1005 is operable to pass the image data selected with the radio button 1003 or 1004 to a print service to perform printing. Here, the ID "Print-photo" in HTML is allocated to the "PRINT" button 1005. When detecting that the "PRINT" button 1005 has been pressed, the web browser 750 of the information processing terminal 530 executes ECMAScript illustrated in FIG. 10A.

Now, the sequence diagram of FIG. 9 is referred to back.

In the screen displayed in step S904, when detecting that the "PRINT" button 1005 (FIG. 10B) has been pressed by the user, the web browser 750 of the information processing terminal 530, serving as the UA 106, performs processing in step S905. In step S905, the web browser 750 of the information processing terminal 530 performs processing for determining execution of a search for a service to be displayed on the display unit 753.

In the processing for determining execution of a search for a service, first, the web browser 750 of the information processing terminal 530 refers to registered services in the service table 800 (here, in the state illustrated in FIG. 8B) and the Web Intents setting 830 (for example, FIG. 8D), and determines whether to search for a local service that is to be displayed in list form on the display unit 753 and that allows processing of "Action" corresponding to the "PRINT" button 1005 pressed by the user. The processing in step S905 is performed to determine whether to search for a local service that allows processing of "Action" of Web Intents specified in step S904, such as "print". Now, the processing performed by the web browser 750 of the information processing terminal 530, including the processing in step S905, is described in detail with reference to FIG. 13.

Figure 13:
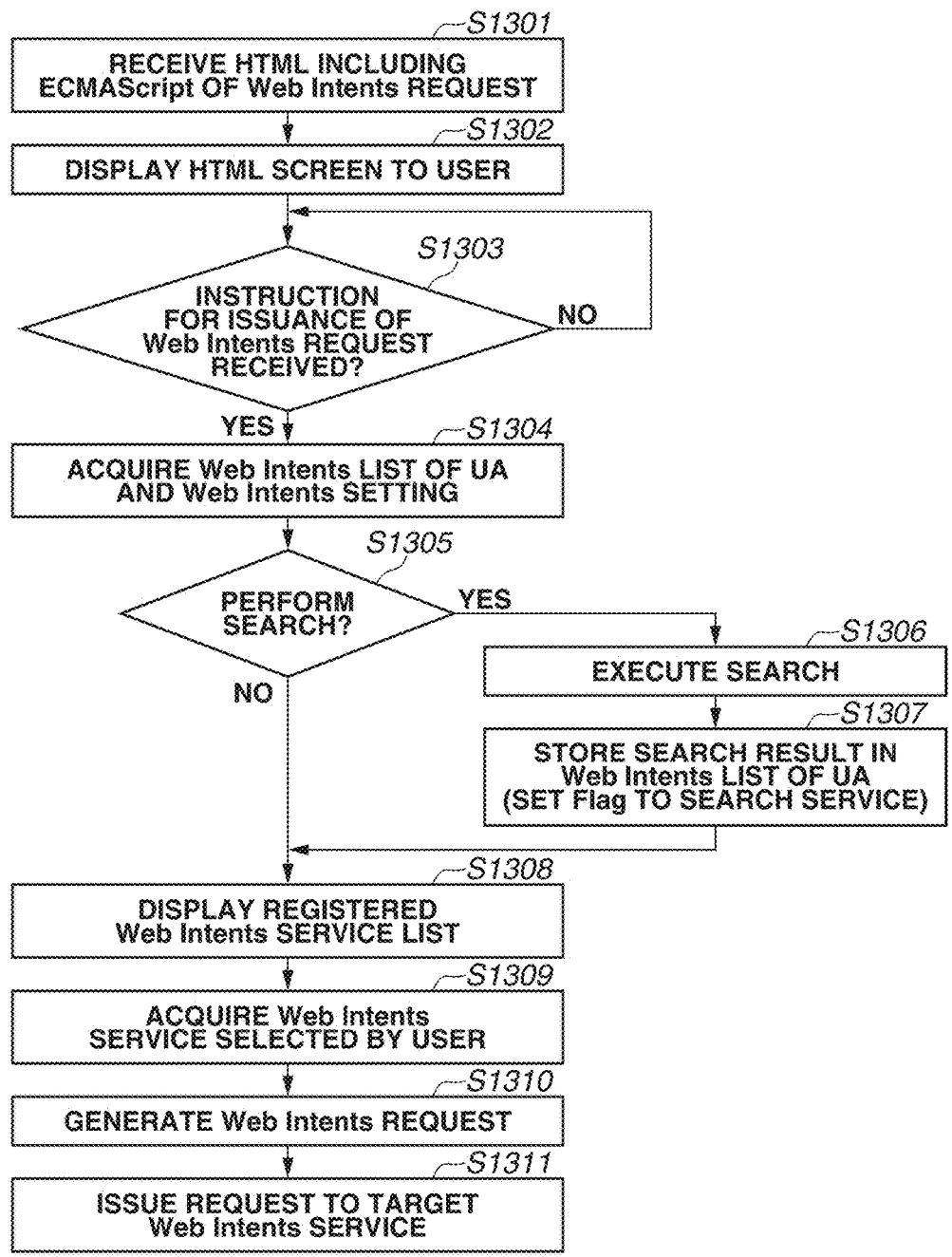
FIG. 13 is a flowchart illustrating an example of processing performed by the UA according to the first exemplary embodiment.

FIG. 13 is a flowchart illustrating an example of processing performed by the web browser 750 of the information processing terminal 530, which is the UA 106 in the present exemplary embodiment. This processing corresponds to processing performed by the web browser 750 of the information processing terminal 530, and includes processing for searching for and displaying a service that allows processing of "Action" of Web Intents specified in step S904 illustrated in FIG. 9.

In step S1301, the web browser 750 of the information processing terminal 530 receives, as an HTTP response message, page information generated by the web application 700 of the server 510, serving as the client 101, in step S902 illustrated in FIG. 9 and sent as a response in step S903. Furthermore, in the web browser 750 of the information processing terminal 530, the analysis unit 752 analyzes the received data and the script processing unit 757 processes the data including ECMAScript of the Web Intents request.

Then, in step S1302, the web browser 750 of the information processing terminal 530 displays the HTML document acquired in step S1301 on the display unit 753 (which corresponds to step S904 illustrated in FIG. 9).

Then, in step S1303, the web browser 750 of the information processing terminal 530 waits for an instruction for issuing a Web Intents request by the user to be received from a screen displayed on the display unit 753 in step S1302. For example, in the present exemplary embodiment, the instruction for issuing a Web Intents request is issued when the image data "image001.png", the image file "Type" 803 of which is "png", is selected and the "PRINT" button 1005 is pressed.

Then, if, in step S1303, it is determined that the instruction for issuing a Web Intents request has been received (YES in step S1303), the web browser 750 of the information processing terminal 530 advances the processing to step S1304.

In step S1304, the web browser 750 of the information processing terminal 530 acquires the service table 800 (a Web Intents list) and the Web Intents setting 830 from the service information storage unit 758 via the service information management unit 755. Here, the following description is made on the assumption that, for example, the service table 800 is in such a state as that illustrated in FIG. 8B and the Web Intents setting 830 is in such a state as that illustrated in FIG. 8D.

The Web Intents setting includes information for determining whether to perform a search, according to the "Action" 802, the "Type" 803, and the registration of services the local service Flag 806 of which is "ON". In the example illustrated in FIG. 8D, with regard to services the "Action" 802 of which is "print", a service the local service Flag 806 of which is "ON" is set to be prioritized (is set to have a higher order of priority). Furthermore, with regard to services the "Action" 802 of which is "share", the local service Flag 806 is set not to be used for determination.

In other words, in the example illustrated in FIG. 8D, in the case of a setting in which the "Action" 802 is "print", a service the local service Flag of which is "ON" (a service found by search) is set to be more preferentially used than a service the registration of Web intents of which was conventionally performed (a service registered as in step S900 illustrated in FIG. 9). Furthermore, in a case where, in the service table 800, there is no service the local service Flag of which is "ON" and there is a service the registration of which was conventionally performed from a server, the search processing is set to be performed. Furthermore, with regard to services the "Action" 802 of which is "share", since the setting of priority based on the local service Flag is not performed, in a case where, in the service table 800, there is a service the registration of which was conventionally performed from a server, the search processing is set not to be performed. Moreover, since there are no settings with regard to other than cases where the "Action" 802 is "print" or "share", the search processing is set to be performed in cases other than a case where the "Action" 802 is "print" or "share" (for example, cases where the "Action" 802 is "edit", "save", etc.).

In step S1305, the web browser 750 of the information processing terminal 530 determines whether to perform a search (local service search processing) based on the instruction for issuing a Web Intents request, received in step S1303, and the service table 800 and the Web Intents setting, received in step S1304.

The determination performed in step S1305 is now described with reference to a specific example.

First, the service determination unit 756 of the web browser 750 of the information processing terminal 530 determines whether a service that allows processing of the requested "Action" exists in the registered Web Intents. This determination is performed to determine whether a service that allows processing of the data "Type" and "Action" requested from the server 510 exists.

Now, a case where image data "image001.png" the image file "Type" 803 of which is "png" has been selected and the "PRINT" button 1005 has been pressed is specifically described as an example. In this case, only a service the Service ID 801 of which is "1" is registered in the service table 800 (which is assumed to be in the state illustrated in FIG. 8B). Since the service the Service ID 801 of which is "1" has the "Action" 802 set to "print" and the "Type" 803 set to "image/*", it is determined that the service the Service ID 801 of which is "1" is a service that allows processing of the requested "Action". Furthermore, since the local service Flag 806 is not "ON", this service is a service the registration of which was conventionally performed from a server. On the other hand, in the Web Intents setting, a setting the setting ID 831 of which is "1" has the "Action" 832 set to "print", the "Type" 833 set to "image/*", and the local service Flag 834 set to not "ON", the setting the setting ID 831 of which is "1" coincides with the service the Service ID 801 of which is "1". The setting the setting ID 831 of which is "1" has also the local service search processing 836 set to "Perform Local Service Search" and the local service registration processing 837 set to "Register Local Service". Therefore, in this case, the service determination unit 756 determines to search for a local service and to register the local service found by search.

If, in step S1305, the service determination unit 756 has determined to perform a search (YES in step S1305), the web browser 750 of the information processing terminal 530 advances the processing to step S1306. In step S1306, the web browser 750 of the information processing terminal 530 causes the search unit 759 to execute a search (which corresponds to step S906 illustrated in FIG. 9). In the above-mentioned example, the search unit 759 searches for a local service the "Action" of which is "print" and the "Type" of which is "png". Accordingly, for example, a local service (LAN) that the local server 521 provides, etc., are found by search.

An example of a search request packet that the search unit 759 transmits to be used for search processing is illustrated in FIG. 11A.

FIG. 11A illustrates an example of the search request packet.

As a result of the search in step S1306, for example, a local service that the local server (printer) 521 provides or a local service (intra-device service) that is located within the information processing terminal 530 sends a search response (steps S907 and S908).

An example of a search response packet that is sent in response to the search request packet is illustrated in FIG. 11B.

FIG. 11B illustrates an example of the search response packet.

While, in the present exemplary embodiment, an example in which a multicast search in the Simple Service Discovery Protocol (SSDP) is performed is shown, other types of search packets can also be used to implement the above-mentioned search processing.

Furthermore, the search processing for services may be configured to perform a search without specifying "Action" and "Type", to filter the responding services with function information of Web Intents, such as "Action" and "Type", and to search for a service that allows processing of the desired "Action" and "Type", or may be configured to perform a search after specifying "Action" and "Type" from the start. Furthermore, the search processing may be configured to request and acquire service extension information 807 from the service found by search, or the search response packet may contain the service extension information 807. Moreover, in a case where the search response packet does not contain function information of Web Intents, the search processing may be configured to request function information of Web Intents from the responding services and acquire the function information of Web Intents including "Action" and "Type".

After the search processing in step S1306, then in step S1307, the web browser 750 of the information processing terminal 530 performs registration processing for storing information of the service found by search into the service table 800. This registration processing is performed to also store, as a search result, the local service Flag 806. In this instance, the web browser 750 sets the local service Flag 806 to "ON (LAN)" with regard to a service located in the LAN 508, and sets the local service Flag 806 to "ON (Intra-device Service)" with regard to a service located in a local host. Furthermore, at the time of registration processing, the web browser 750 deletes, from the service table 800, a local service that is previously registered in the service table 800 but has not been found by the search in step S1306.

Furthermore, although not illustrated in FIG. 13, in a case where the Web Intents setting used for determination in step S1305 has the local service registration processing 837 set to "Do Not Register Local Service", the web browser 750 skips processing in step S1307 and advances the processing to step S1308.

Now, the registration processing in step S1307 is described with reference to FIG. 14.

Figure 14:
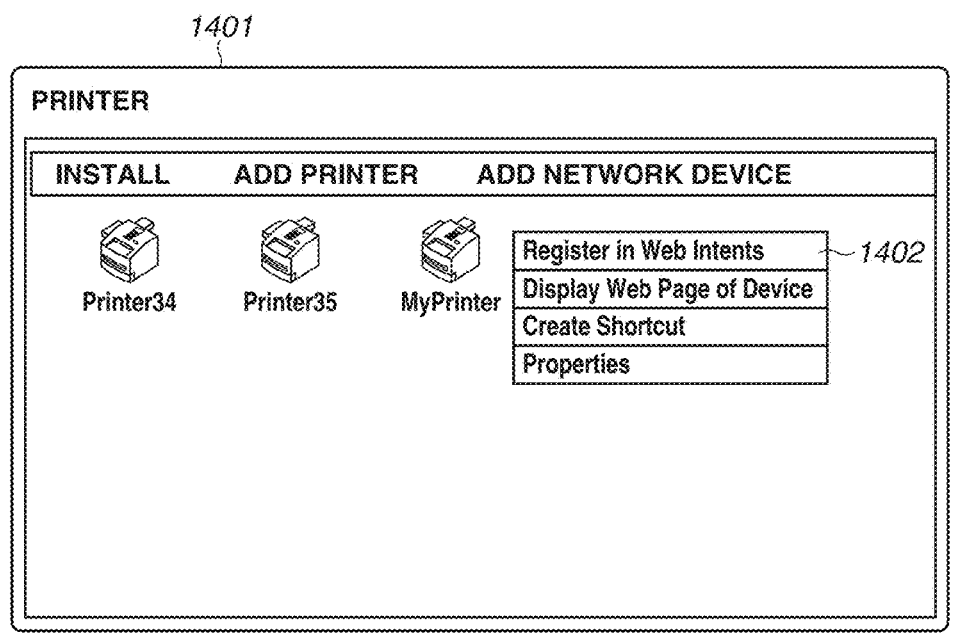
FIG. 14 illustrates an example of a user interface (UI) screen for local service registration processing according to the first exemplary embodiment.

FIG. 14 illustrates an example of a user interface (UI) screen used for local service registration processing in the Web Intents setting 830.

In a case where the service determination unit 756 has determined to register the local service found by search, the web browser 750 displays a Web Intents setting dialog 1401. Here, an example in which the "Action" of Web Intents is set to "print" is shown, and the Web Intents setting dialog 1401 is a printer setting dialog. In the Web Intents setting dialog 1401, there are displayed the local services found by search. In the example illustrated in FIG. 14, a case where three printers (local services) have been found by search as a result of the local service search processing is illustrated.

In the example illustrated in FIG. 14, a Web Intents setting menu 1402 allows the user to select "Register in Web Intents" with respect to "MyPrinter" so as to register function information of "MyPrinter" in the service information storage unit 758 (the service table 800).

Furthermore, besides the registration after the search processing, the user can perform the registration or change of setting of a local service by explicitly using the Web Intents setting dialog 1401. For example, the user can perform the menu "ADD NETWORK DEVICE" via the Web Intents setting dialog 1401 and register a service that the added network device provides in Web Intents via the Web Intents setting menu 1402. In this case, the registered local service is registered in such a way as to have the local service Flag 806 set to "ON (Manual Setting Service)" as in the service the Service ID 801 of which is "4".

In the above-described search processing for a local service, since it is necessary to detect an unspecified local service on the LAN 508, a multicast search is performed. In the multicast search, all of the local services capable of responding to a search request on the LAN 508 specified by a multicast packet (such as that illustrated in FIG. 11A) return the respective responses (such as that illustrated in FIG. 11B). Therefore, in a case where there exists an unnecessary local service that the user does not desire to use, such an unnecessary service is searched for. If all of the services found by search are registered, an unnecessary service may be stored in the service information storage unit 758. However, if the user explicitly issues a registration instruction via a UI such as that illustrated in FIG. 14, the user is allowed to selectively register the desired service in the service information storage unit 758.

Now, the flowchart of FIG. 13 is referred to back.

Supposing that the service table 800 obtained after the registration processing in step S1307 is, for example, in the state illustrated in FIG. 8A, the processing is performed as follows.

After the registration processing in step S1307, the web browser 750 of the information processing terminal 530 advances the processing to step S1308. Furthermore, if, in step S1305, the service determination unit 756 has determined not to perform a search (NO in step S1305), the web browser 750 of the information processing terminal 530 advances the processing directly to step S1308.

In step S1308, the web browser 750 of the information processing terminal 530 generates a list of services (a service list). More specifically, in step S909, the web browser 750 generates a list of services the "Action" and "Type" of which coincide with those of the request based on the service table 800, and, in step S910, displays the generated list of services. The list of services displayed here is the one updated according to a result of the search. For example, the web browser 750 generates and displays the list of services in such a way that the list does not contain any service the registration of function information of which has been deleted from the service table 800 as a result of the search. Furthermore, the web browser 750 generates and displays the list of services in such a way that the list also does not contain any service that is in a state incapable of providing the service in view of the service extension information 807 (i.e., the state of the service) as a result of the search.

Figure 12:
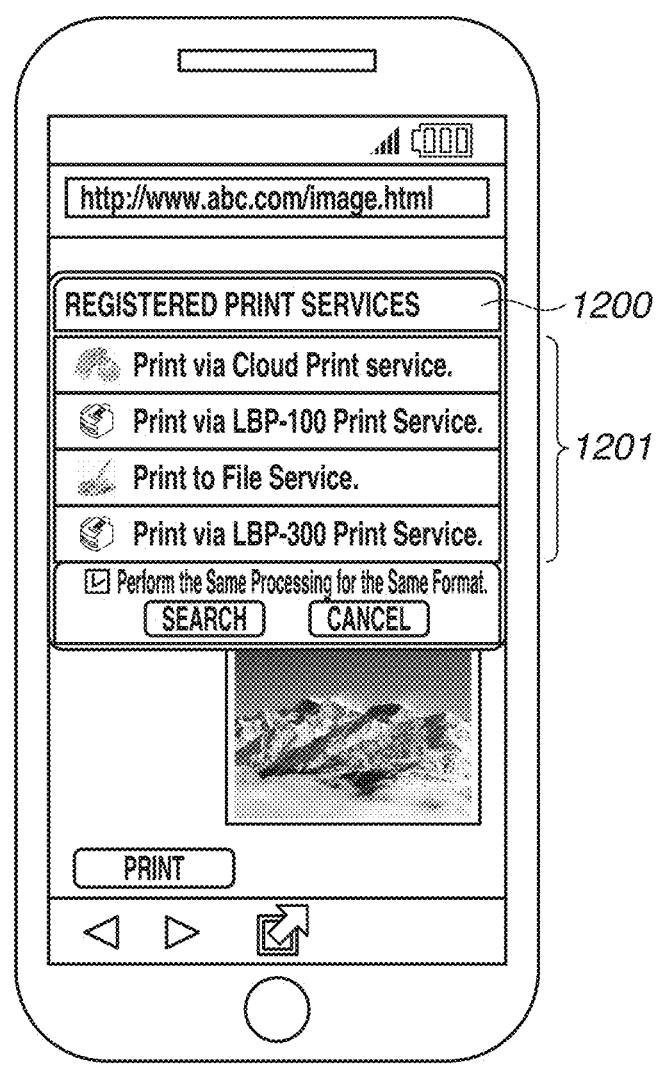
FIG. 12 illustrates an example of a service list screen according to the first exemplary embodiment.

FIG. 12 illustrates an example of the service list, which is displayed on the web browser 750 in the first exemplary embodiment. A pop-up screen 1200 is displayed by the web browser 750 of the information processing terminal 530 when the "PRINT" button 1005 (FIG. 10B) is pressed. A list 1201 of services is displayed in response to the request made by the user (in this example, the press of the "PRINT" button 1005).

When the user has selected any one of the services from the list 1201 of services, the web browser 750 advances the processing to step S1309.

In step S1309, the web browser 750 identifies the service selected by the user and acquires information on the identified service from the service information storage unit 758.

Then, in step S1310, the script processing unit 757 of the web browser 750 generates a Web Intents request.

Moreover, in step S1311, the script processing unit 757 issues the request to the target Web Intents service.

Steps S1310 and S1311 are more specifically described with reference to FIG. 9.

First, the analysis unit 752 of the web browser 750 of the information processing terminal 530 transmits, as an HTTP request message, a request for acquiring image data to the server 510 via the communication unit 751. This is implemented by executing a getImageFrom( ) function invoked within an unnamed function included in ECMAScript illustrated in FIG. 10A. For example, if the radio button 1003 is selected on the UI 1000 illustrated in FIG. 10B, then in step S911, the analysis unit 752 makes a request for acquiring image data "image001.png". While, in the present exemplary embodiment, the analysis unit 752 makes an acquisition request to the server 510, the web browser 750 may be configured not to make an acquisition request but to use image data included in an HTML document that is previously acquired by the web browser 750.

In response to the acquisition request made in step S911, then in step S912, the content management unit 704 of the server 510 acquires image data, specified by the image data acquisition request received in step S911, from the content management table 820 of the database service unit 705. For example, if the file name of image data specified by the image data acquisition request is "image001.png", the content management unit 704 of the server 510 acquires image data located at the first record of the content management table 820.

Then, in step S913, the presentation unit 703 of the server 510 transmits, as an HTTP response message, the image data acquired in step S912 to the information processing terminal 530 via the communication unit 701. Then, the web browser 750 of the information processing terminal 530 receives the message transmitted in step S913 and then advances the processing to step S914.

In step S914, the script processing unit 757 of the information processing terminal 530 generates a Web Intents request and performs processing for invoking, for example, a local service (LAN) that the local server (printer) 521 provides. In this processing, the script processing unit 757 of the information processing terminal 530 uses the image data "image001.png", acquired in step S913, as an invocation parameter for the local service (LAN). Then, in step S915, the web browser 750 of the information processing terminal 530 transmits the request to the service displayed in step S910 and selected by the user. For example, the web browser 750 of the information processing terminal 530 transmits the request to the web application 740 of the local server 521.

In response to the request made in step S915, then in step S916, the Intent processing unit 742 of the web application 740 of the local server 521 extracts an Intent object from the request received in step S915 and analyzes the Intent object. Subsequently, the web application 740 of the local server 521 starts processing the analyzed Intent object. For example, the web application 740 of the local server 521 provides a "Print" service, which prints image data included in the Intent object, while interacting with the user via the web browser 750 of the information processing terminal 530. For example, the web application 740 of the local server 521 generates an HTML document used to receive an operation for inputting and storing the file name of image data, and transmits the HTML document to the information processing terminal 530. The web browser 750 of the information processing terminal 530 receives the HTML document and displays a UI. Then, when detecting the "Print" operation performed by the user, the web browser 750 of the information processing terminal 530 transmits a request for printing image data to the web application 740 of the local server 521. When the web application 740 of the local server 521 receives the request for printing image data, the content processing unit 744 prints image data specified by the user based on the content management table 820 managed by the database service unit 745.

When the Intent processing has been completed, then in step S917, the web application 740 of the local server 521 returns a response containing ECMAScript for notifying the server 510 of the processing result.

In step S918, the web browser 750 of the information processing terminal 530 executes ECMAScript contained in the response returned in step S917 and invokes a callback function specified by an argument for the startActivity( ) function contained in the page displayed in step S904. For example, if ECMAScript is such as illustrated in FIG. 10A, the web browser 750 of the information processing terminal 530 executes a callback function onSuccess( ).

Then, in step S1919, the web browser 750 of the information processing terminal 530 returns the Web Intents processing result to the web application 700 of the server 510 according to the callback function.

When receiving the Web Intents processing result returned in step S1919, then, in step S1920, the presentation unit 703 of the web application 700 of the server 510 generates a completion page, which is a page for indicating that the Intent processing has been completed, with an HTML document. Then, in step S921, the presentation unit 703 of the web application 700 of the server 510 transmits the completion page generated in step S920 to the information processing terminal 530 via the communication unit 701.

In step S922, the web browser 750 of the information processing terminal 530 displays the completion page for the Web Intents processing, received in step S921.

When the above-mentioned steps S900 to S922 have been performed, the search result for local Web Intents is stored into the service information storage unit 758. For example, assuming that the service table 800 at the current time is in the state illustrated in FIG. 8A, the following operation is performed.

According to the above-mentioned search response processing in step S907, information on a local service (LAN) that the local server 521 provides is recorded, as "LBP-100 Print Service", on a row the Service ID 801 of which is "2" in FIG. 8A. Furthermore, similarly, according to the search response processing, information "Print to File Service" indicating a local service that is provided within the information processing terminal 530 is registered on a row the Service ID 801 of which is "3". While, in steps S906 to S907, the search and response operations are described only with respect to a local service (LAN), those are similarly applied to a local service (Intra-device Service). Moreover, information "LBP-300 Print Service (Manual Input)" indicating that Web Intents information, such as an address, has been manually input is registered on a row the Service ID 801 of which is "4". In this state, when receiving such a user operation as inputting the URL of the web application 700 of the server 510 (client) to the address bar or the like, the web browser 750 of the information processing terminal 530 starts the following processing operation.

While, in the present exemplary embodiment, the URL of the web application 730 is taken as an example, this does not need to be limited to the same URL as that used in the above-mentioned step S901. A URL other than that of the web application 730 may be specified as long as this allows the web browser 750 of the information processing terminal 530 to perform Invocation processing of Web Intents leading to a next step.

In step S923, the web browser 750 transmits a page request as an HTTP request message to the server 510 via the communication unit 751 (similar to step S901). When receiving the page request transmitted from the information processing terminal 530, the web application 700 of the server 510 performs processing in step S924. In step S924, the web application 700 of the server 510 generates a page (similar to step S902). In step S925, the web application 700 of the server 510 sends the page generated in step S924, as an HTTP response message, to the web browser 750 of the information processing terminal 530 (Invocation processing) (similar to step S903).

When receiving the page sent as a response from the server 510, the web browser 750 of the information processing terminal 530 performs processing in step S926. In step S926, the display unit 753 of the web browser 750 of the information processing terminal 530 displays the received page (similar to step S904). More specifically, the analysis unit 752 analyzes an HTML document corresponding to the page, and the display unit 753 performs rendering to display the received page.

In the screen displayed in step S926, when detecting that the "PRINT" button 1005 (FIG. 10B) has been pressed by the user, the web browser 750 of the information processing terminal 530, serving as the UA 106, performs processing in step S927. In step S927, the web browser 750 of the information processing terminal 530 performs processing for determining execution of a search for a service to be displayed on the display unit 753.

The processing in step S927 is performed to determine whether to search for a service that allows processing of "Action" of Web Intents specified in step S926, such as "print". More specifically, the web browser 750 of the information processing terminal 530 acquires the service table 800 and the Web Intents setting 830 from the service information storage unit 758 (step S1304 illustrated in FIG. 13). Then, the web browser 750 of the information processing terminal 530 determines whether to perform a search (local service search processing) based on the instruction for issuing a Web Intents request, received in step S1303, and the service table 800 and the Web Intents setting, received in step S1304. In the case of step S927, the local service found by search in the above-mentioned steps S906 to S908 is already registered as a service the Service ID 801 of which is "2". Therefore, in a case where data the "Action" 802 of which is "print" and the "Type" 803 of which is "image/*" is to be processed, the service determination unit 756 determines whether to perform local service search processing, based on the setting the setting ID 831 of which is "2". Since, in the setting the setting ID 831 of which is "2", the local service search processing 836 is set to "Do Not Perform Local Service Search", the service determination unit 756 determines not to perform a search. Therefore, the web browser 750 of the information processing terminal 530 does not perform a local service search, and, in step S928, the service information management unit 755 generates a service list from the services registered in the service information storage unit 758 and displays the service list (step S1308 illustrated in FIG. 13).

Processing in step S928 and subsequent steps can be implemented with the same processing as that performed in steps S910 to S922. In the above-described way, since a local service already found by search is recorded, together with search information, on the service information storage unit 758, the user is allowed to use a local service without performing any unnecessary search.

As described above, in the present exemplary embodiment, the web browser 750 of the information processing terminal 530 discriminates (distinguishes) between a service stored and managed in the UA conventionally registered in Web Intents and a local service found by search, to manage the services.

Furthermore, a configuration that does not perform a local service search each time when receiving Invocation of Web Intents but uses a previously registered local service based on the Web Intents setting has been described. This configuration enables preventing an unnecessary service for the user from being registered due to a search being performed each time at the time of reception of Invocation, so that the user can easily find a service that the user desires to use. Furthermore, this configuration can reduce an increase in network traffic caused by searching.

In this way, according to the present exemplary embodiment, when a local service is used, optimum local service search control can be performed, an unnecessary search can be prevented from being repeated, an unusable service can be prevented from being registered or displayed, and an optimum service list can be provided to the user. Thus, a service execution environment that enables the user to readily select and use various services that network devices provide, such as services on the Internet and local services, can be constructed.

In the first exemplary embodiment, a configuration that controls the presence or absence of execution of a local service search according to Web intents setting (in particular, the setting of the local service search processing 836) in a case where a service a request for which the web browser 750 of the information processing terminal 530 is able to process exists in the service information storage unit 758 has been described.

In a second exemplary embodiment, a configuration that updates a registered local service according to Web Intents setting (in particular, the setting of the local service update processing 838) in a case where the web browser 750 of the information processing terminal 530 does not perform a local service search is described. In the second exemplary embodiment, constituent elements and processing operations similar to those of the first exemplary embodiment are omitted from description.

In the following, processing for updating a registered local service in a case where the web browser 750 of the information processing terminal 530 does not perform a local service search is described with reference to the sequence diagram of FIG. 15 and the flowchart of FIG. 17.

Figure 15B:
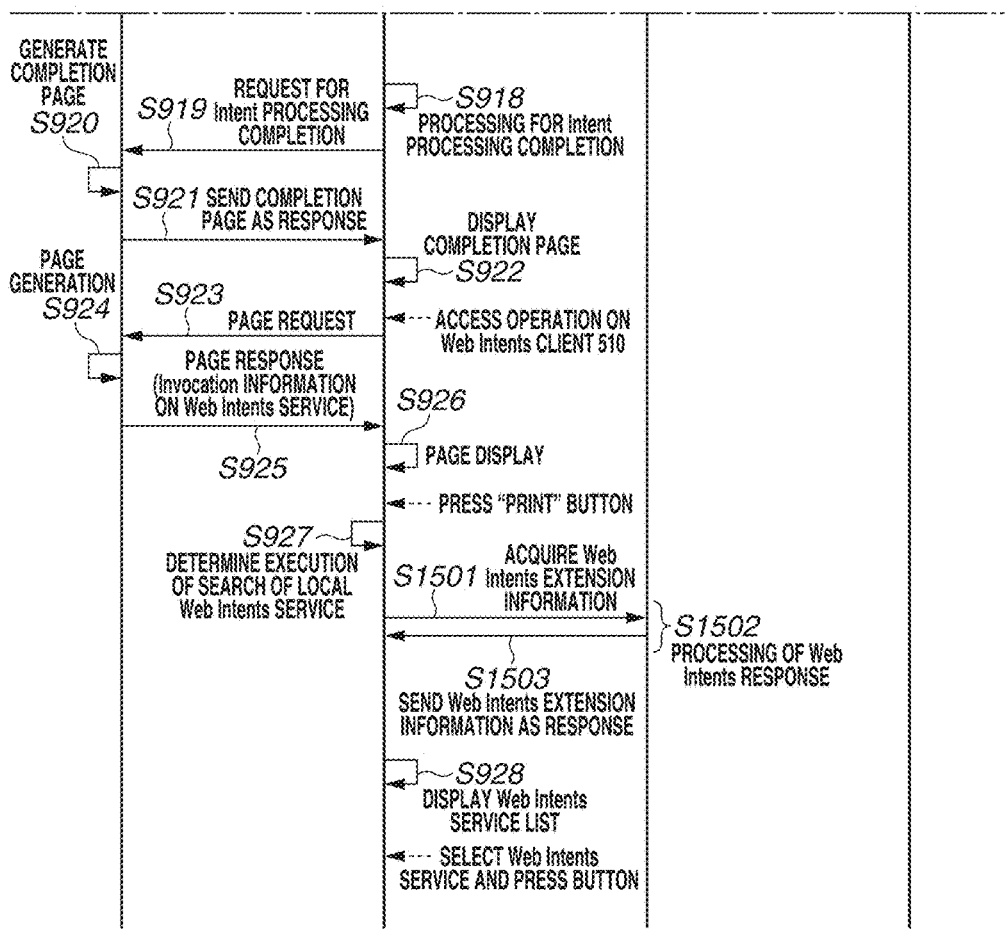
FIG. 15, which is composed of FIGS. 15A and 15B, is a sequence diagram according to a second exemplary embodiment.

FIG. 15, which is composed of FIGS. 15A and 15B, is a sequence diagram illustrating an example of an operation concerning the provision of a service using Web Intents in the second exemplary embodiment. While FIG. 15 illustrates only a sequence for updating extension information of a local service (LAN), the same also applies to a local service (intra-device service). Furthermore, the same steps as those illustrated in FIG. 9 are assigned with the respective same step numbers.

Figure 17:
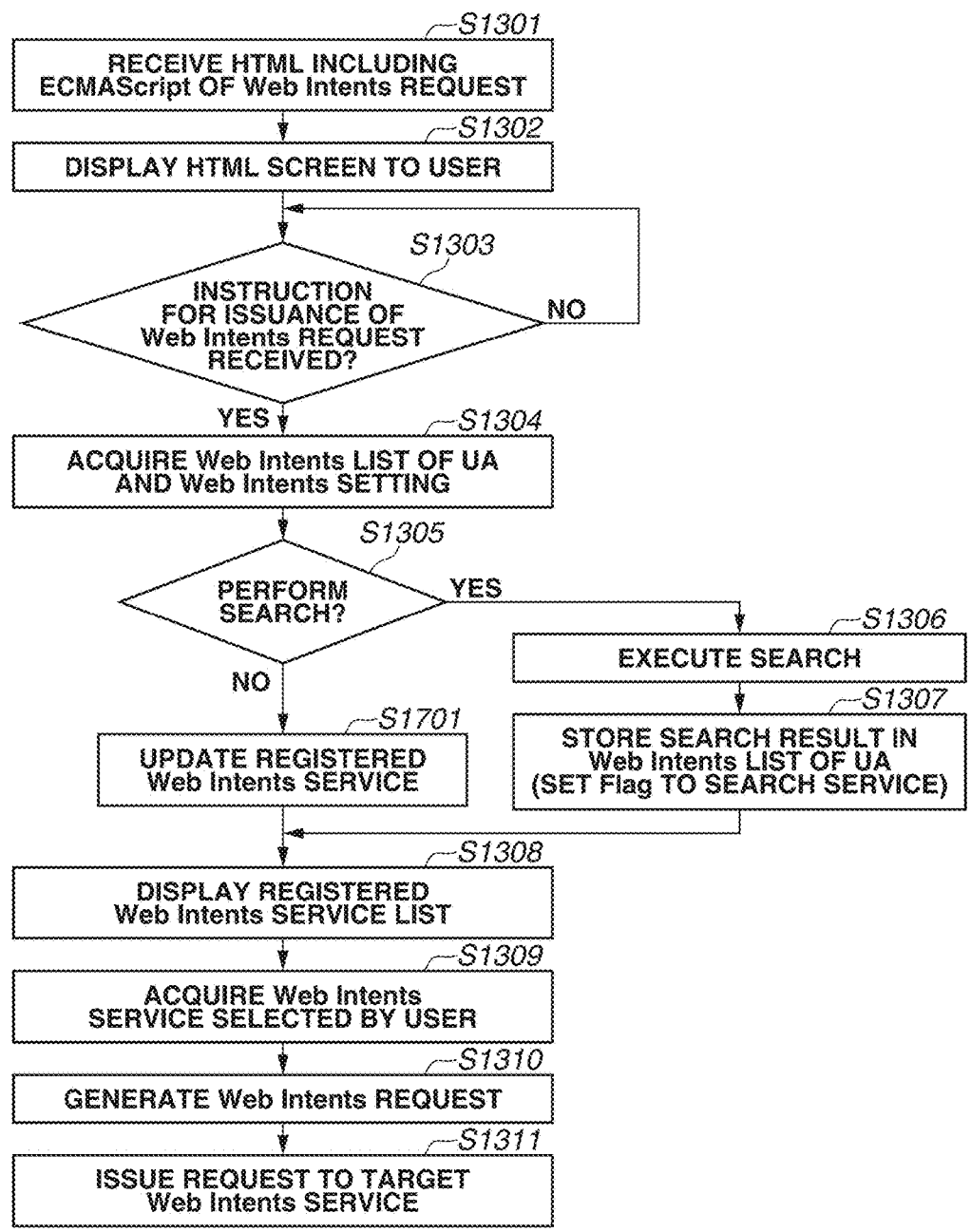
FIG. 17 is a flowchart illustrating an example of processing performed by the UA according to the second exemplary embodiment.

FIG. 17 is a flowchart illustrating an example of processing performed by the web browser 750 of the information processing terminal 530, which is the UA 106, in the second exemplary embodiment. Furthermore, the same steps as those illustrated in FIG. 13 are assigned with the respective same step numbers.

In step S1306, the web browser 750 of the information processing terminal 530 causes the search unit 759 to execute a search (which corresponds to step S906). In the above-mentioned example, the search unit 759 searches for a local service the "Action" of which is "print" and the "Type" of which is "png". Accordingly, for example, a local service (LAN) that the local server 521 provides is searched for. Specially, an example of a search request packet that the search unit 759 transmits is illustrated in FIG. 11A. In the present exemplary embodiment, an example in which a multicast search in the SSDP is performed is shown. As a result, for example, a local service (LAN) that the local server (printer) 521 provides or a local service (intra-device service) located within the information processing terminal 530 sends a response to the search (steps S907 and S908). An example of the search response packet is illustrated in FIG. 11B.

After performing the search processing in step S1306, then in step S1307, the web browser 750 of the information processing terminal 530 performs registration processing to store information about services found by search into the service table 800. In this registration processing, the web browser 750 additionally stores the local service Flag 806 as a search result. In this instance, the web browser 750 registers "ON (LAN)" with the local service Flag 806 with regard to a service located in the LAN 508, and registers "ON (Intra-device Service)" with the local service Flag 806 with regard to a service located in a local host. The following is described assuming that the service table 800 obtained after being subjected to the registration processing in step S1307 is, for example, in the state illustrated in FIG. 8A. The description of steps S909 to S922 is not repeated.

Then, under this condition, step S923 and subsequent steps are performed.

In step S923, the web browser 750 transmits a page request as an HTTP request message to the server 510 via the communication unit 751 (similar to step S901). The description of steps S924 to S926 is not repeated.

Then, in the screen displayed in step S926, the user can press the "PRINT" button and select a registered service stored in the service information storage unit 758 from the service list.

However, a local service, unlike a service provided via the Internet 505, may have changed with respect to the service providing condition from that at the time of registration thereof. For example, in some cases, a local service (LAN) that the local server (printer) 521 provides cannot be provided. For example, services may not be provided in a case where a communication error occurs due to the local server (printer) 521 being powered off or in a case where printing is unavailable because of the shortage of consumables, such as toner, ink, or paper. Thus, in a case where local services are stored in the service information storage unit 758, the user may select an unavailable service.

However, if processing for searching for local services is performed each time at the time of reception of Invocation, depending on the circumstances, a plurality of services that the user does not use may be found and may be then included in a service list, so that it may become hard for the user to select a desired service. In the present exemplary embodiment, the use of the local service Flag 834 enables efficiently updating the state of a local service stored in the service information storage unit 758.

In step S927, the web browser 750 of the information processing terminal 530 determines whether to perform a search (local service search processing), based on the service table 800 and the Web Intents setting 830, which are acquired from the service information storage unit 758. In the case of step S927, a local service found by search in steps S906 to S908 is already registered in the row the Service ID of which is "2". Therefore, in a case where data the "Action" 802 of which is "print" and the "Type" 803 of which is "image/*" is to be processed, the service determination unit 756 determines whether to perform local service search processing, based on the setting the setting ID 831 of which is "2". Since, in the setting the setting ID 831 of which is "2", the local service search processing 836 is set to "Do Not Perform Local Service Search", the service determination unit 756 determines not to perform a search. However, since, in the setting the setting ID 831 of which is "2", the local service update processing 838 is set to "Perform Local Service Update Processing", the web browser 750 of the information processing terminal 530 determines not to perform a local service search, but to perform only local service update processing.

In step S1701, the web browser 750 of the information processing terminal 530 updates a registered Web Intents service. This local service update processing is, unlike the above-mentioned local service search processing using a multicast search in the SSDP, performed to update only the state of a registered local service with unicast information acquisition performed on services stored in the service information storage unit 758.

Furthermore, although not illustrated in FIG. 17, in a case where, in the Web Intents setting used for the determination in step S1305, the local service update processing 838 is set to "Do Not Perform Local Service Update Processing", the web browser 750 of the information processing terminal 530 skips processing in step S1701 and advances the processing to step S1308.

In the following, the local service update processing (step S1701) is more specifically described with reference to FIG. 17.

First, in step S1501, the web browser 750 transmits an HTML Get request (not illustrated) to the address of "href" 804 of a local service stored in the service information storage unit 758 (a service the local service Flag 806 of which is "ON").

In step S1502, in response to the request transmitted in step S1501, the web application 740 of the local server 521 generates response data responsive to the HTML Get request. Then, in step S1503, the web application 740 of the local server 521 returns, to the web browser 750, a response including Web Intents extension information in a Web Intents registration markup. Examples of the response are illustrated in FIGS. 16A and 16B.

The example illustrated in FIG. 16A corresponds to an example of a response packet 1601 including the device state "state="Ready"" in Web Intents extension information, which the web application 740 of the local server 521 returns.

The example illustrated in FIG. 16B corresponds to an example of a response packet 1602 including states of a plurality of services different in the "Type" 803 in Web Intents extension information, which the web application 740 of the local server 521 returns. While, in FIG. 16B, an example of a response packet including states of a plurality of services different in the "Type" 803 is illustrated, the same can also be applied to a case where a packet response includes states of a plurality of services different in the "Action" 802.

Furthermore, consumables information, which may dynamically vary, can be included, as extension information, in a response packet. The service determination unit 756 can determine the state of a service based on such dynamic information. For example, consumables information such as "state=A4-paperlow" can be included in a response packet, thus enabling determining that the remaining amount of A4 paper stored in a printer that provides the service has become small.

The service information management unit 755 of the web browser 750 updates information about a service registered in the service information storage unit 758 (the service table 800), based on a result of response from a local service.

Furthermore, the service information management unit 755 deletes, from the service information storage unit 758 (the service table 800), a service that has timed out before the web browser 750 receives the response packet. Then, in step S1308 (step S928), the web browser 750 of the information processing terminal 530 generates and displays a list of services (a service list). The service list displayed at this time is the one that has been updated based on a result of update processing (step S1701). For example, the web browser 750 generates and displays the service list in such a way as not to include, in the service list, a service the function information of which has been deleted from the service table 800 as a result of update processing. Furthermore, the web browser 750 generates and displays the service list also in such a way as not to include, in the service list, a service the service extension information 807 of which (i.e., the state of a service) indicates that the service cannot be provided, as a result of update processing.

The subsequent processing operations are similar to those of the first exemplary embodiment, and are, therefore, omitted from description.

Furthermore, this example illustrates a case where, with respect to a service the Service ID 801 of which in the service table 800 is "2", an HTTP request transmitted by the web browser 750 in step S1501 has timed out. In this case, since the web application 740 of the local server 521 does not perform return processing in step S1503, the service determination unit 756 of the web browser 750 updates the service table 800 as illustrated in FIG. 18A, by deleting information about the service the Service ID 801 of which is "2" from the service information storage unit 758 (the service table 800).

FIG. 18A illustrates an example of the service table 800 obtained after updating of the registered services in step S1701 illustrated in FIG. 17.

In the example illustrated in FIG. 18A, since no response is received from a local service the Service ID 801 of which is "2", it is determined that the local service has become nonexistent, so that the local service has been deleted.

Furthermore, another example illustrates a case where a service the Service ID 801 of which in the service table 800 is "2" has returned a response packet including "State=A4-paperlow, colorprint" as Web Intents extension information. In this case, the service determination unit 756 of the web browser 750 updates information about the service the Service ID 801 of which is "2", stored in the service information storage unit 758 (the service table 800), as illustrated in FIG. 18B.

In the example illustrated in FIG. 18B, the service extension information ("extend") 807 of the local service the Service ID 801 of which is "2" is updated as "State=A4-paperlow, colorprint".

Figure 19:
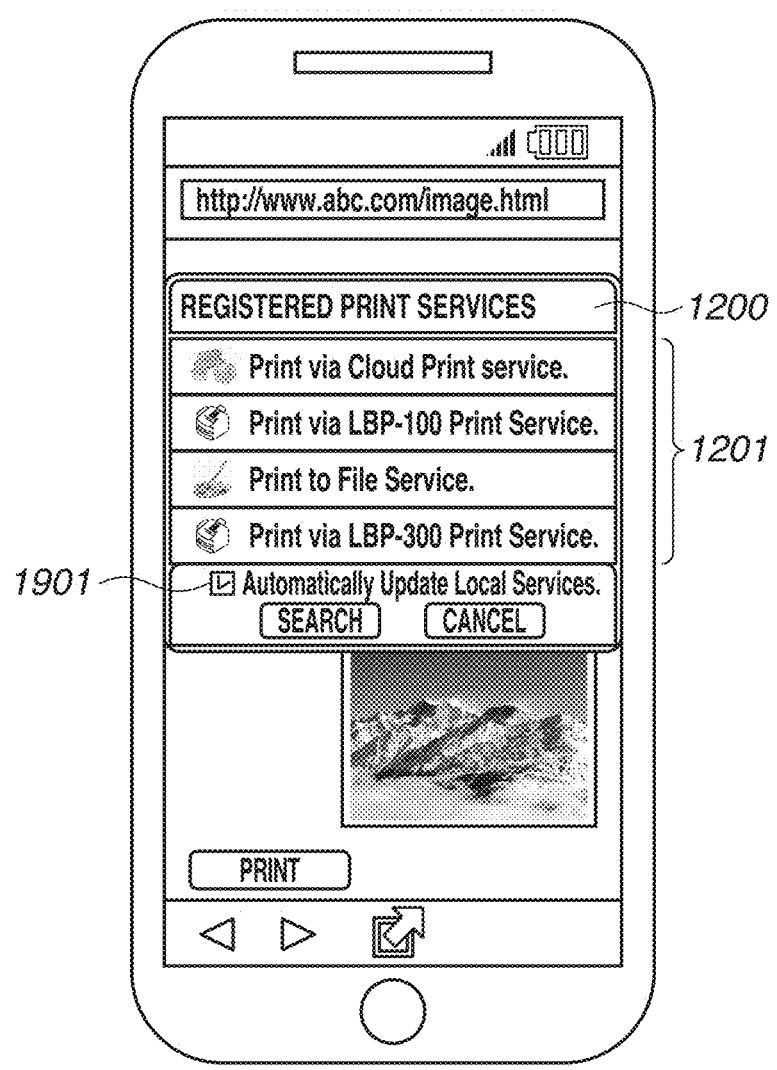
FIG. 19 illustrates an example of a service list screen according to the second exemplary embodiment.

FIG. 19 illustrates an example of a service list that is displayed by the web browser 750 in the second exemplary embodiment. The same elements as those illustrated in FIG. 12 are assigned with the respective same reference numerals.

The example illustrated in FIG. 19 indicates a setting UI used to automatically perform updating without displaying a registration UI for Web Intents information, in a case where the web browser 750 of the information processing terminal 530 registers service information of a local service in the service information storage unit 758 (the service table 800).

A check box 1901 is operable to "Automatically Update Local Services". When the check box 1901 is set (checked), updating of the service information is performed without displaying any notification to the user.

More specifically, in step S1701, to update a registered Web Intents service, the web browser 750 of the information processing terminal 530 registers the Web Intents extension information received in step S1503 in the service information storage unit 758 (the service table 800) without displaying information, which is to be registered, for confirmation by the user. Therefore, since the confirmation display is not performed each time for updating, the user's convenience during updating of information can be enhanced.

According to the present exemplary embodiment, the web browser 750 of the information processing terminal 530 can efficiently update the state of a local service stored in the service information storage unit 758, thus providing an optimum service list to the user. Furthermore, since the number of searches for local services (the repetition of unnecessary searches) is reduced or the registration or display of an unavailable service is prevented, the user's operability can be improved and network traffic can be reduced. Moreover, since the confirmation display is not performed each time for updating, the user's convenience during updating of information can be enhanced. Therefore, the present exemplary embodiment enables the user to readily select and use various services that network devices provide, such as services on the Internet and local services.

Furthermore, in each of the above-described exemplary embodiments, a case where Web Intents is used as a technology to cooperate with any web service (or any web application) without using a dedicated API has been described. However, the description using Web Intents is merely an example, and another scheme for causing a client and a service to cooperate with each other via a similar relay function may be used. For example, a technology called "Web Activities" (Mozilla Corporation) may be used, or a similar unique specification may be used to implement the present invention. In this case, pieces of information corresponding to "Action", "Type", "href", "title", etc., may be defined with the respective different names.

In addition, the structures and contents of the above-described various data are not restrictive, but may be changed or altered in various manners depending on use and purpose.

While exemplary embodiments have been described above, the present invention can be embodied as, for example, a system, an apparatus, a method, a program, or a storage medium. In particular, the present invention can also be applied to a system composed of a plurality of devices or can also be applied to an apparatus composed of a single device.

Furthermore, a configuration obtained by combining the above-described exemplary embodiments is also encompassed by the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-143237 filed Jul. 11, 2014, which is hereby incorporated by reference herein in its entirety.

What is claimed is:

1. An information processing terminal having a relay function for causing a client that manages data and a service that provides a function using the data managed by the client to cooperate with each other, the information processing terminal comprising:
a memory storing instructions related to the relay function; and
a processor which is capable of executing the instructions causing the information processing terminal to:
by searching for services via a network using a predetermined network protocol, acquire first function information, which is used to request a first service provided by a network device connected to the network;
acquire second function information, which is used to request a second service, via a site of a network device that provides the second service;
execute, using the relay function, registration processing of the acquired first function information and the acquired second function information, wherein, through the relay function, the first function information and the second function information are individually managed as a target to perform a search for a corresponding service and as a target not to perform the search, respectively;
display a page based on page data provided by the client; and
in response to a detection that a button on the displayed page has been pressed, control display of a list of function information including the first function information and the second function information registered according to the registration processing, wherein, if the service corresponding to the first function information that has previously been registered according to the registration processing has been found by a search for services via the network using the predetermined network protocol, the display of the list is updated according to a state of the first service included in a result of the search,
wherein a search for acquiring the state is not performed on the network with respect to the second service corresponding to the second function information included in the list.

2. The information processing terminal according to claim 1, wherein the instructions further cause the information processing terminal to manage, as extension information of the first function information, a state of a service acquired by using the predetermined network protocol.

3. The information processing terminal according to claim 1, wherein the instructions further cause the information processing terminal to receive a setting whether to perform the search based on a state of registration of the first function information,
wherein execution of the search of the first function information is controlled based on the state of registration of the first function information and a result of the received setting.

4. A control method for an information processing terminal having a relay function for causing a client that manages data and a service that provides a function using the data managed by the client to cooperate with each other, the control method comprising:
by searching for services via a network using a predetermined network protocol, acquiring first function information, which is used to request a first service provided by a network device connected to the network;
acquiring second function information, which is used to request a second service, via a site of a network device that provides the second service;
executing, using the relay function, registration processing of the acquired first function information and the acquired second function information, wherein, through the relay function, the first function information and the second function information are individually managed as a target to perform a search for a corresponding service and as a target not to perform the search, respectively;
displaying a page based on page data provided by the client; and
in response to a detection that a button on the displayed page has been pressed, controlling display of a list of function information including the first function information and the second function information registered according to the registration processing, wherein, if the service corresponding to the first function information that has previously been registered according to the registration processing has been found by a search for services via the network using the predetermined network protocol, the display of the list is updated according to a state of the first service included in a result of the search,
wherein a search for acquiring the state is not performed on the network with respect to the second service corresponding to the second function information included in the list.

5. A non-transitory computer-readable storage medium storing a computer program for realizing a relay function, which causes a computer to execute a control method for causing a client that manages data and a service that provides a function using the data managed by the client to cooperate with each other, the control method comprising:
by searching for services via a network using a predetermined network protocol, acquiring first function information, which is used to request a first service provided by a network device connected to the network;
acquiring second function information, which is used to request a second service, via a site of a network device that provides the second service;
executing, using the relay function, registration processing of the acquired first function information and the acquired second function information, wherein, through the relay function, the first function information and the second function information are individually managed as a target to perform a search for a corresponding service and as a target not to perform the search, respectively;

displaying a page based on page data provided by the client; and in response to a detection that a button on the displayed page has been pressed, controlling display of a list of function information including the first function information and the second function information registered according to the registration processing, wherein, if the service corresponding to the first function information that has previously been registered according to the registration processing has been found by a search for services via the network using the predetermined network protocol, the display of the list is updated according to a state of the first service included in a result of the search, wherein a search for acquiring the state is not performed on the network with respect to the second service corresponding to the second function information included in the list.

* * * * *